United States Patent [19]
Ooka et al.

[11] Patent Number: 5,410,645
[45] Date of Patent: Apr. 25, 1995

[54] METHODS FOR GENERATING FREE CURVES AND SCULPTURED SURFACES

[75] Inventors: Miwa Ooka; Tetsuzo Kuragano, both of Tokyo, Japan

[73] Assignee: Sony Corporation, Tokyo, Japan

[21] Appl. No.: 267,838

[22] Filed: Jun. 28, 1994

Related U.S. Application Data

[63] Continuation of Ser. No. 853,918, Mar. 19, 1992, abandoned.

[30] Foreign Application Priority Data

Mar. 20, 1991 [JP] Japan ................... 3-081905

[51] Int. Cl.$^6$ ............................... G06F 15/62
[52] U.S. Cl. ..................... 395/142; 395/120; 395/127; 395/143; 364/474.29
[58] Field of Search ............... 395/140–143, 395/119, 120, 127, 125, 155–161; 364/474.28, 474.29, 474.01–474.03; 345/138, 139

[56] References Cited

U.S. PATENT DOCUMENTS 4,866,631 9/1989 Kuragano et al. .......... 340/728 X
5,065,348 11/1991 Kuragano et al. ........... 340/729

*Primary Examiner*—Almis Jankus
*Attorney, Agent, or Firm*—Charles P. Sammut; Limbach & Limbach

[57] ABSTRACT

Methods for generating free curves and sculptured surfaces illustratively for use with a computer aided design/computer aided manufacturing (CAD/CAM) apparatus whereby Bezier curves and surfaces are readily generated with reference to point sequences, point groups and surfaces. In operation, a starting point and an end point for a sequence of points are set as nodes, and a free curve is temporarily established thereby. Then control points are repeatedly established to minimize the shortest distances between the points in the sequence and the free curve. By use of the coordinates of a plurality of points, the shortest distance is found between each of these points and a reference patch. The internal control points are set so as to minimize the total sum of these shortest distances. When a patch is generated whose external shape is represented by a plurality of points, with another plurality of points also set on the reference patch for modification, a Bezier surface is generated with respect to these point groups and surfaces.

5 Claims, 15 Drawing Sheets

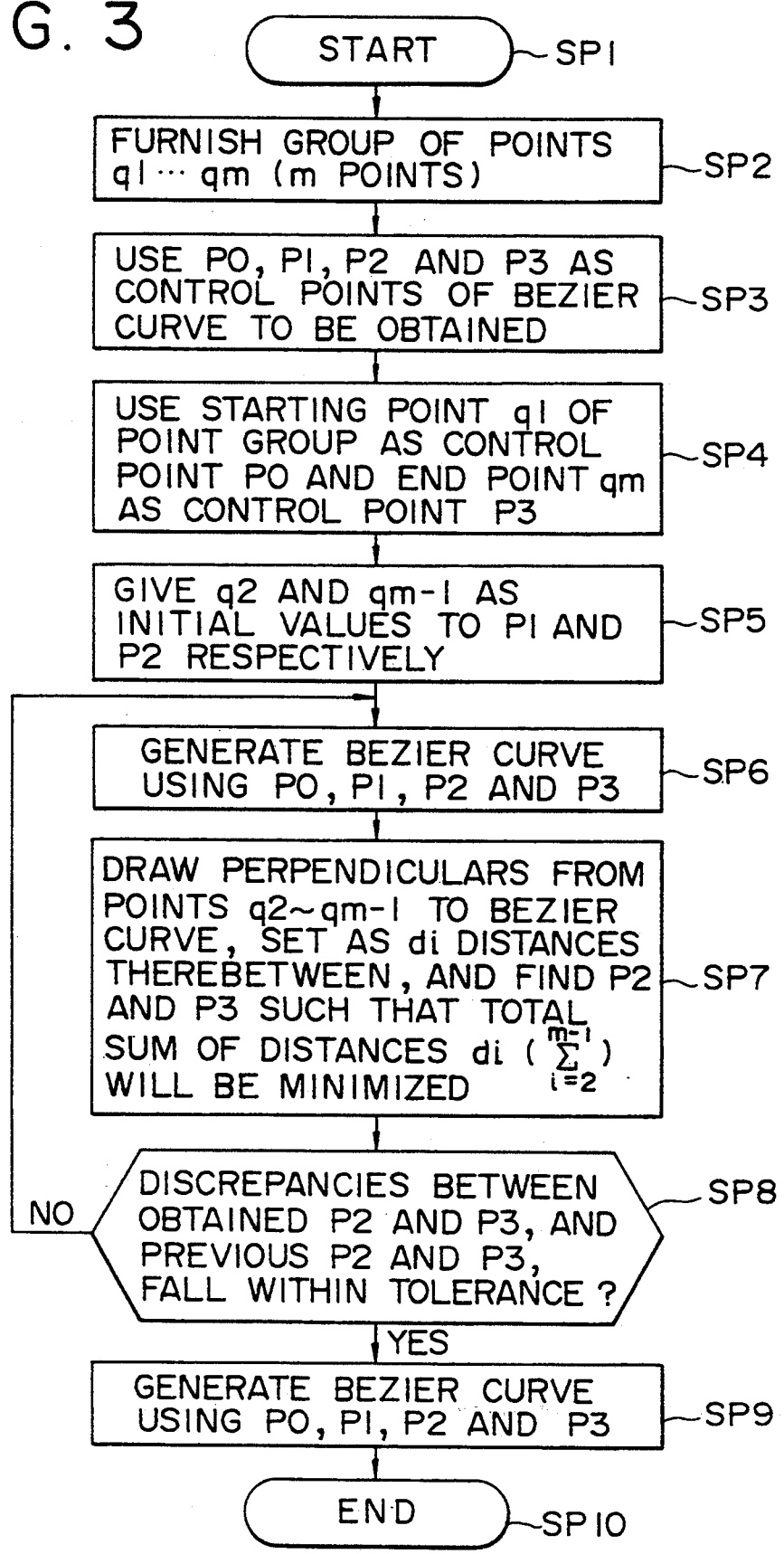

F I G. 11
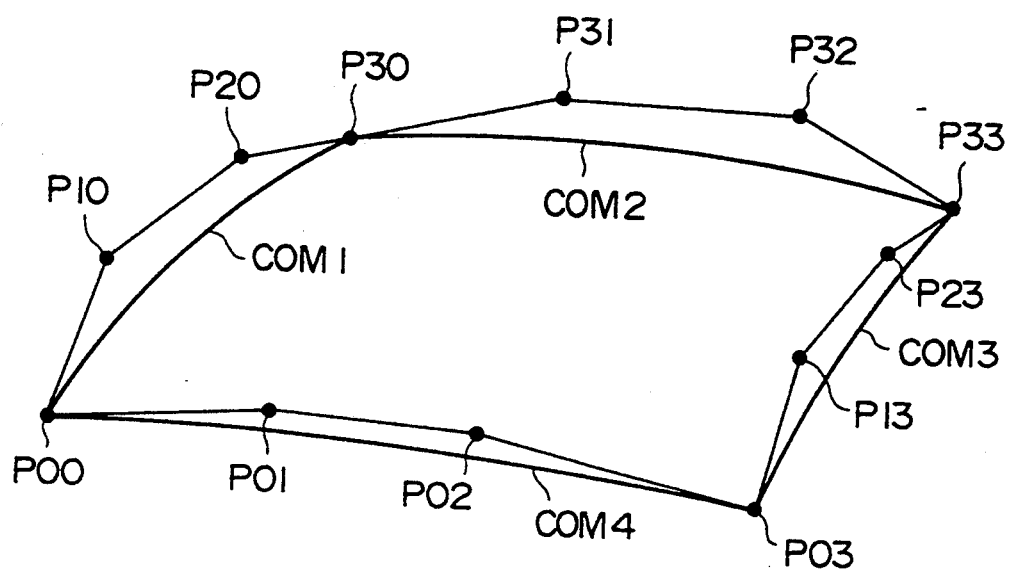
F I G. 12
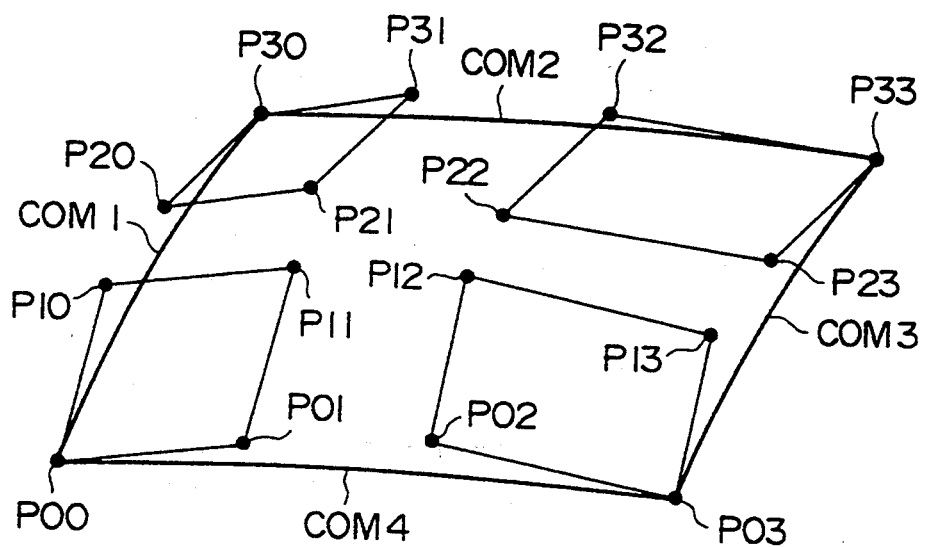

EQUIBRIGHTNESS CURVE

METHODS FOR GENERATING FREE CURVES AND SCULPTURED SURFACES

This is a continuation of application Ser. No. 07/853,918 filed on Mar. 19, 1992, now abandoned.

BACKGROUND OF THE INVENTION

1. Field of the Invention

The present invention relates to methods for generating free curves and sculptured surfaces for use with the designing apparatus for CAD/CAM (computer aided design/computer aided manufacturing) applications.

2. Description of the Prior Art

In a geometric modeling application where an object with a sculptured surface is to be designed, the designer designates a plurality of points (called nodes) in the three-dimensional space to be traversed by that surface. The designated nodes are calculated using a desired vector function so that the nodes are connected by a boundary curve network. This provides a surface expressed by what is known as a wire frame. In this manner, there are generated a large number of frame spaces enclosed by boundary curves (this is called a framing process).

The boundary curve network generated by the framing process presents itself approximately as what the designer wants to design. In this case, a surface may be interpolated as the expression of a predetermined vector function using the boundary curves that enclose each frame space. Taken as a whole, this is the sculptured surface designed by the designer (and not defined by secondary functions). Each surface occupying each frame space constitutes a component that makes up the entire surface. The component is called a patch.

There was proposed a free curve generating method whereby the control side vectors around a common boundary between two adjacent frame spaces are modified in order to establish a patch that will satisfy the condition for tangent plane continuation on that common boundary. The major object of this prior art method is to provide the entire sculptured surface with a more natural external shape.

As shown in FIG. 27, this prior art sculptured surface generating method involves first locating a patch vector S(u, v)1 and a patch vector S(u, v)2 in a rectangular frame space and having them expressed by a vector function S(u, v) constituting a cubic Bezier equation. The two patch vectors S(u, v)1 and S(u, v)2 are connected smoothly as follows. When node vectors P(00), P(30)1, P(33)1, P(03), P(33)2 and P(30)2 are furnished by the framing process, there are accordingly established control side vectors a1, a2, c1 and c2 in such a manner that the condition for tangent plane continuation is met on a common boundary COM between adjacent patch vectors S(u, v)1 and S(u, v)2. These control side vectors are used to modify control point vectors P(11)1, P(12)1, P(11)2 and P(12)2.

The above method is applied consecutively to other common boundaries. This eventually results in the smooth connection of the patch vectors S(u, v)1 and S(u, v)2 on the condition of tangent plane continuation with the adjacent patches.

The vector function S(u, v) constituted by a cubic Bezier equation is expressed as $$S(u,v) = (1-u+u E)^3 (1-v+v F)^3 P(00) \quad (1)$$

where, u and v are parameters for u and v directions respectively, and E and F are shift operators. Furthermore, the vector function S(u, v) has those relations with a control point vector P(ij) which are defined as $$E \cdot P(ij) = P(i+1 j) \quad (i \backslash j = 0 \backslash 1 \backslash 2) \quad (2)$$

$$F \cdot P(ij) = P(ij+1) \quad (i \backslash j = 0 \backslash 1 \backslash 2) \quad (3)$$

$$0 \leq u \leq 1 \quad (4)$$

$$0 \leq v \leq 1 \quad (5)$$

The tangent plane is a plane formed by tangent vectors in the u and v directions at each of the nodes on a common boundary. For example, where the patch vectors S(u, v)1 and S(u, v)2 in FIG. 27 share the same tangent plane on a common boundary COM12, the condition of tangent plane continuation is met.

The above prior art method allows the designer to design cubic shapes that are otherwise difficult to design, such as those whose surfaces change smoothly. Nevertheless, some improvements may be envisaged for this method.

On a designing apparatus operating on the above method, it will be convenient if the external shape of a target object is input in the form of a sequence of points. This requires forming a wire frame model that connects the sequence of the points that were input. It is also necessary to have Bezier curves represent the free curves that constitute the wire frame model. Furthermore, on the generated wire frame model, a sculptured surface must be formed so that it will traverse the input points.

If the patches generated in the above process are corrected using curved or otherwise shaped surfaces, it will also be convenient. The ability to modify the surface shape in this manner will make it possible not only to correct patch size but also to set up the frame space anew as needed.

SUMMARY OF THE INVENTION

It is therefore an object of the present invention to provide methods for generating free curves and sculptured surfaces by use of Bezier curves and surfaces based on the furnished sequence of points, group of points, or surface.

In carrying out the invention and according to one aspect thereof, there is provided a method for generating a free curve expressed by a vector function R(t) using a predetermined parameter t on the basis of two node vectors P0 and P3 in a cubic space, the two node vectors having control point vectors P1 and P2 interposed therebetween, the method comprising the steps of: establishing to the node vectors P0 and P3 a starting point vector q1 and an end point vector qm for input point sequence vectors q1 through qm; temporarily establishing the control point vectors P1 and P2 based on point vectors q2 and qm-1 in the point sequence vectors q1 through qm, the point vectors q2 and qm-1 being adjacent to the starting point vector q1 and the end point vector qm; drawing perpendiculars from the point vectors q2 through qm-1 in the point sequence vectors q1 through qm down to the free curve vector R(t) determined by the node vectors P0 and P3 and by the control point vectors P1 and P2, the perpendiculars being drawn so as to find parameters ti of the intersection points between them and the free curve vector R(t); reestablishing the control point vectors P1 and P2 so as to minimize the total sum of distances di between the point vectors q2 through qm-1 in the point sequence vectors q1 through qm on the one hand, and the intersection points defined by the parameters ti on the free curve vector R(t) on the other; and generating the free curve vector R(t) approximating the point sequence vectors q1 through qm by use of the established node vectors P0 and P3 and of the reestablished control point vectors P1 and P2.

According to another aspect of the invention, there is provided a method for generating a sculptured surface by locating in a frame space a patch vector S(u, v) expressed by a predetermined vector function S(u, v) on the basis of internal control point vectors P11, P12, P21 and P22 established in the frame space enclosed by boundary curves COM1, COM2, COM3 and COM4 in a cubic space, the method comprising the steps of: detecting the shortest distances di, based on the coordinate data of a plurality of point vectors q1 through qm, between these vectors q1 through qm on the one hand and a reference patch vector S(u, v) on the other; and generating the patch vector v) by establishing the internal control point vectors P11, P12, P21 and P22 so as to minimize the total sum of the shortest distances di.

According to a further aspect of the invention, there is provided a method for generating a sculptured surface by locating in a frame space a patch vector S(u, v) expressed by a predetermined vector function S(u, v) on the basis of internal control point vectors P11, P12, P21 and P22 established in the frame space enclosed by boundary curves COM1, COM2, COM3 and COM4 in a cubic space, the method comprising the steps of: detecting the shortest distances di between a plurality of point vectors q1 through qm on the one hand, and the patch vector S(u, v) formed in the frame space on the other; establishing the internal control point vectors P11, P12, P21 and P22 in the frame space containing the patch vector S(u, v) so as to minimize the total sum of the shortest distances di; and generating the patch vector S(u, v) of a patch in such a manner that the external shape of that patch is expressed by the plurality of point vectors q1 through qm.

According to a still further aspect of the invention, there is provided a method for generating a sculptured surface by locating in a frame space a patch vector S(u, v) expressed by a predetermined vector function S(u, v) on the basis of internal control point vectors P11, P12, P21 and P22 established in the frame space enclosed by boundary curves COM1, COM2, COM3 and COM4 in a cubic space, the method comprising the steps of: establishing a plurality of point vectors q1 through qm on a target patch vector S(u, v)M for modification; detecting the shortest distances di between the plurality of point vectors q1 through qm on the one hand and the patch vector S(u, v) to be modified on the other; establishing the internal control point vectors P11, P12, P21 and P22 within the frame space of the patch vector S(u, v) to be modified, the establishing of the internal control point vectors being performed in such a manner as to minimize the total sum of the shortest distances di; and generating the patch vector S(u, v) approximating the target patch in shape within the frame space of the patch vector S(u, v) to be modified.

In operation, perpendiculars are first drawn from the point vectors q2 through qm-1 of the input point sequence vectors q1 through qm to the free curve vector R(t) determined by the node vectors P0 and P3 and by the control point vectors P1 and P2. The perpendiculars are drawn in order to detect the parameters ti of the intersection points between the perpendiculars and the free curve vector R(t). The control point vectors P1 and P2 are reestablished so as to minimize the total sum of the distances di determined by the parameters ti between the point vectors q2 through qm-1 in the input point sequence vectors q1 through qm on the one hand, and the free curve vector R(t) on the other. Given the established node vectors P0 and P3 as well as the reestablished control point vectors P1 and P2, it is easy to generate the free curve vector R(t) approximating the point sequence vectors q1 through qm. In this manner, the free curve vector R(t) is generated by simply inputting the point sequence vectors q1 through qm.

By use of the coordinate data of the multiple point vectors q1 through qm, the shortest distances di are found between these point vectors and the reference patch vector S(u, v). The internal control point vectors P11, P12, P21 and P22 are established so as to minimize the total sum of the shortest distances di, whereby the patch vector S(u, v) is generated. In this manner, the patch vector S(u, v) with the surface of the desired shape is made available.

In the above setup, the internal control point vectors P11, P12, P21 and P22 may be established in the frame space of the patch vector S(u, v) so as to generate a patch vector S(u, v) having the external shape expressed by the multiple point vectors q1 through qm. As described, the patch vector S(u, v) is generated by simply inputting the point vectors q1 through qm.

Where the multiple point vectors q1 through qm are established on the patch vector S(u, v) to be modified, the internal control point vectors P11, P12, P21 and P22 may be established in the frame space of the patch S(u, v) to be modified so as to minimize the total sum of the shortest distances di between the point vectors q1 through qm on the one hand and the target patch vector S(u, v)M for modification on the other. In this manner, where the frame space is modified, the patch vector S(u, v)E of the original surface shape is still made available.

Further objects, features and advantages of the invention will become more apparent upon a reading of the following description and appended drawings.

BRIEF DESCRIPTION OF THE DRAWINGS

FIG. 3 is a flowchart indicating the steps for generating segments of the curve;

FIG. 11 is a schematic view describing how boundary curves are generated;

FIG. 12 is a schematic view depicting how internal control points are established;

DESCRIPTION OF THE PREFERRED EMBODIMENT

A preferred embodiment of the invention will now be described with reference to the accompanying drawings.

(1) Overall Configuration of CAD/CAM System

Figure 1:
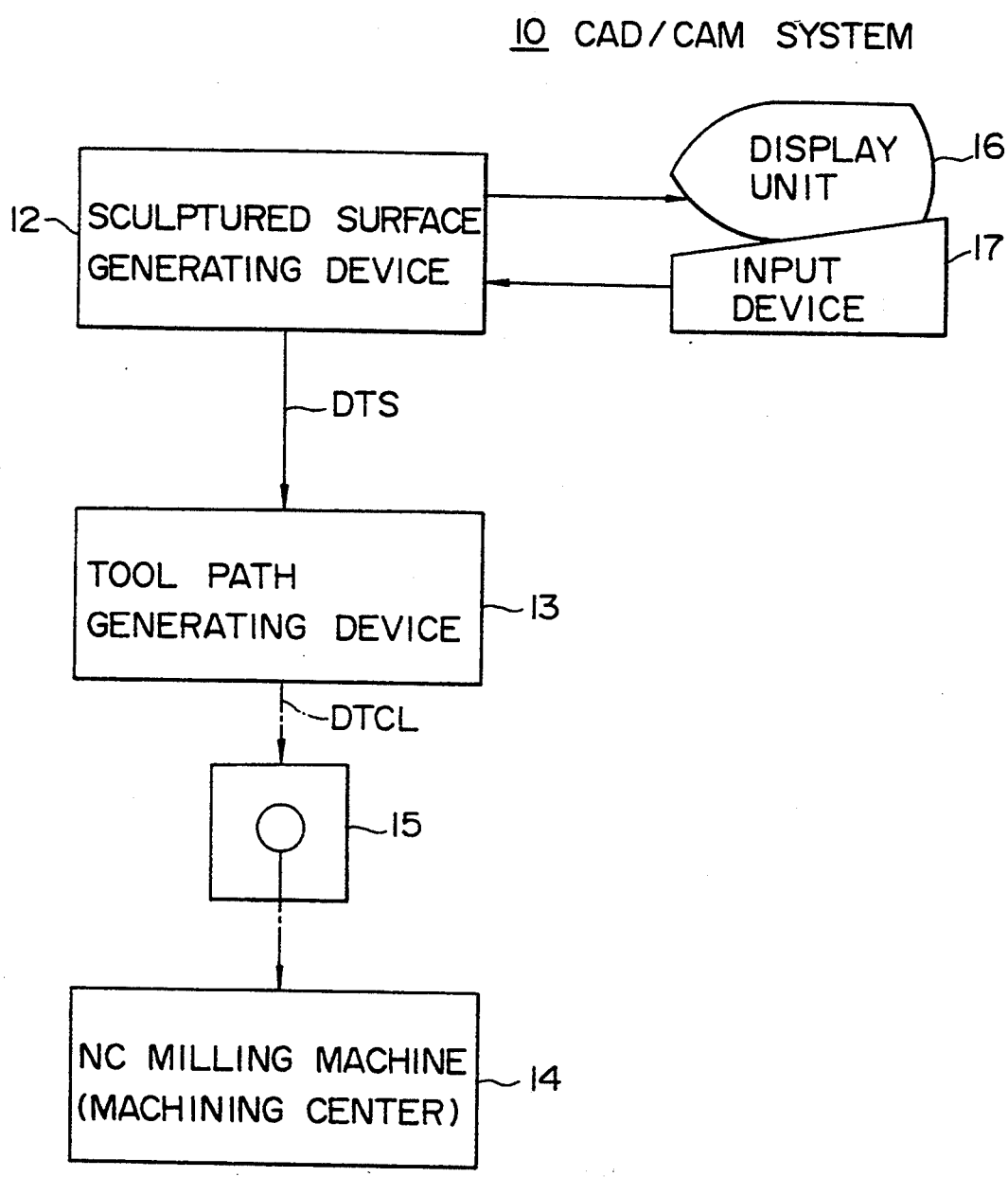
FIG. 1 is a block diagram of a CAD/CAM system to which the present invention is applied.

In FIG. 1, reference numeral 10 is a typical CAD/CAM system in its entirety to which the invention is applied. A sculptured surface generating device 12 generates shape data DTS representing a sculptured surface. After generation of the shape data DTS, a tool path generating device 13 generates cutting data DTCL for cutting work.

The sculptured surface generating device 12 has a central processing unit (CPU) that controls a display 16. The designer responds to indications on the display 16 and operates an input device 17 accordingly. In doing so, the designer designates a wire frame model and establishes therein a patch using a cubic Bezier equation. The patch is then modified in order to generate the shape data DTS representing the desired object having a sculptured surface.

Using the shape data DTS, the tool path generating device 18 generates the cutting data DTCL for roughing and finishing a metal die. Thereafter, the cutting data DTCL is output illustratively via a floppy disk 15 to a numerically controlled (NC) milling machine 14.

The NC milling machine 14 illustratively drives an NC miller using the cutting data DTCL. This completes work on the metal die by which to produce the product represented by the shape data DTS.

(2) Generation of Free Curve (2-1) Principles of Free Curve

Figure 2:
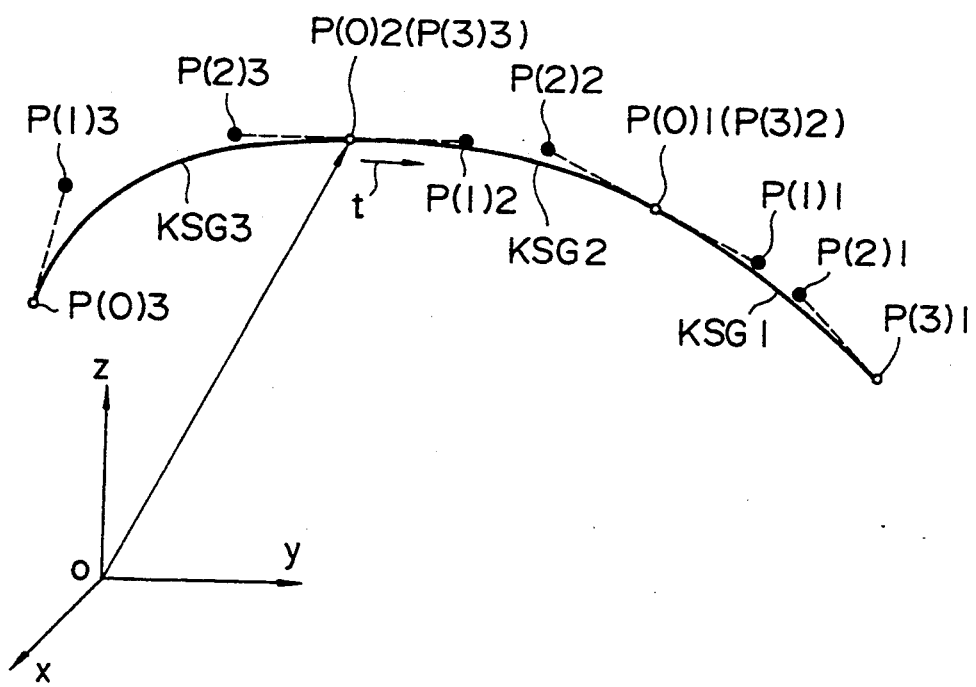
FIG. 2 is a schematic view describing how a free curve is expressed by a vector function.
Figure 4:
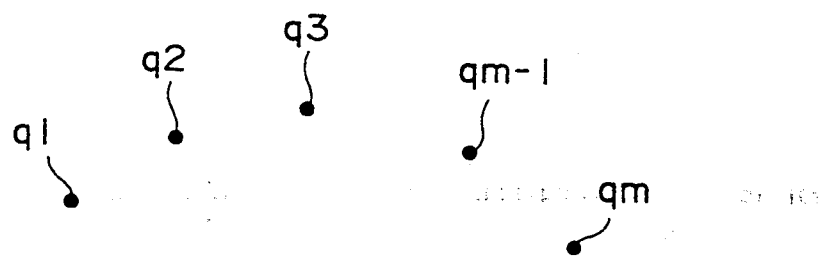
FIG. 4 is a schematic view of a point sequence that is input.

As shown in FIG. 2, a Bezier curve is expressed by use of a cubic Bezier equation representing a parametric space curve vector R(t) given as $$R(t) = (1 - t + t E)^3 P0 \qquad (6)$$

where t is the parameter varying from 0 to 1, i.e., $$0 \leq t \leq 1 \qquad (7)$$

The range of (7) above holds from a node vector P0 to another node vector P3 along a curve segment KSG.

Two control point vectors P1 and P2 are designated using a shift operator E between the node vectors P0 and P3. The curve segment KSG, expressed by the cubic Bezier equation, is represented by the points given by the position vector R(t) relative to origin O of an XYZ space, the vector being furnished by expanding the equation:

$$R(t) = (1-t)^3 P0 + 3(1-t)^2 t\, P1 + 3(1-t)t^2 P2 + t^3 P3 \qquad (8)$$

The shift operator E has certain relations with control point vectors Pi on the curve segment KSG, the relations being given as:

$$E \cdot Pi = Pi + 1 \qquad (9)$$

where, $$i = 0 \backslash 1 \backslash 2 \qquad (10)$$

When Equation (6) is expanded and Equation (9) is inserted therein, one gets:

$$\begin{aligned}
R(t) &= (1 - t + tE)^3 P0 \\
&= \{(1-t)^3 + 3(1-t)^2 tE + 3(1-t)t^2 E^2 + t^3 E^3\} P0 \\
&= (1-t)^3 P0 + 3(1-t)^2 tEP0 + 3(1-t)t^2 E^2 P0 + t^3 E^3 P0 \\
&= (1-t)^3 P0 + 3(1-t)^2 tP1 + 3(1-t)t^2 P2 + t^3 P3
\end{aligned} \qquad (11)$$

As a result of this, Equation (8) is obtained.

Thus the curve segments KSG1, KSG2 and KSG3 expressed by the Bezier curve are represented by two node vectors and two control point vectors each, i.e., P(0)1 through P(0)3, P(1)1 through P(1)3, P(2)1 through P(2)3, and P(3)1 through P(3)3, based on Equation (8). When the control point vectors P(1)1 through P(1)3 and P(2)1 through P(2)3 are established between the node vectors P(0)1 through P(0)3 on the one hand and P(3)1 on the other, a free curve is established whose shape is determined by the control point vectors P(0)1 through P(0)3, P(1)1 through P(1)3, P(2)1 through P(2)3 and P(3)1 through P(3)3, the shape passing through the node vectors P(0)1 through P(0)3 and P(3)1.

(2-2) Generation of Curve Segments

The sculptured surface generating device 12 carries out the steps of FIG. 3 to generate a group of curves approximating the group of points designated by the designer. Started in step SP1 and entering step SP2, the sculptured surface generating device 12 admits the coordinate data of point sequence vectors q1, q2, ..., qm that are input by the designer via an input device 17.

Figure 5:
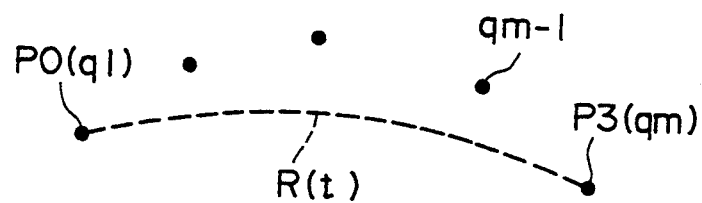
FIG. 5 is a schematic view depicting how a Bezier curve is established temporarily.

Step SP2 is followed by step SP3 in which the sculptured surface generating device 12 temporarily establishes a Bezier curve vector P(t). Step SP4 follows step SP3. In step SP4, the sculptured surface generating device 12 detects a starting point vector q1 and an end point vector qm from the point sequence vectors q1 through qm that are input. Thereafter, as shown in FIG. 5, the sculptured surface generating device 12 establishes the starting point vector q1 and the end point vector qm respectively to the node vectors P0 and P3 of the Bezier curve vector R(t).

Figure 6:
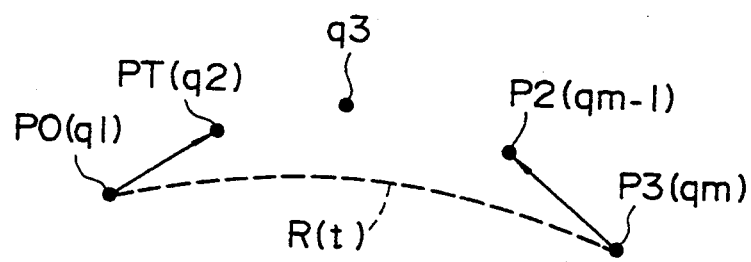
FIG. 6 is a schematic view showing how control points are established temporarily.
Figure 7:
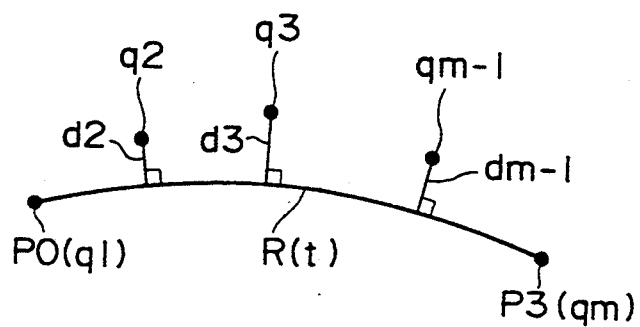
FIG. 7 is a schematic view indicating how distances are found between the curve and the control points.

In step SP5, as depicted in FIG. 6, the sculptured surface generating device 12 establishes the control point vectors P1 and P2 of the Bezier curve vector R(t) respectively to the point vector q2 adjacent to the starting point vector q1 and to the point vector qm-1 adjacent to the end point vector qm.

Step SP5 is followed by step SP6. In step SP6, as illustrated in FIG. 6, the sculptured surface generating device 12 generates the Bezier curve vector R(t) based on the node vectors q1 and qm and the control point vectors q2 and qm-1. Step SP6 is followed by step SP7. At this point, the sculptured surface generating device 12 finds the total sum of the distances di measured as perpendiculars drawn from the point vectors P2 through qm-1 (except for starting point vector q1 and end point vector qm) to the Bezier curve vector R(t). If $$at0 = (1-t)^3 \tag{12}$$

$$at1 = 3(1-t)^2 t \tag{13}$$

$$at2 = 3(1-t)t^2 \tag{14}$$

$$at3 = t^3 \tag{15}$$

then Equation (11) is reduced to $$R(t) = at0 \cdot P0 + at1 \cdot P1 + at2 \cdot P2 + at3 \cdot P3 \tag{16}$$

With this embodiment, the starting point vector q1 and the end point vector qm are established respectively to the node vectors P0 and P1 of the Bezier curve vector R(t). Therefore the Bezier curve vector R(t) is given as $$R(t) = at0 \cdot q1 + at1 \cdot P1 + at2 \cdot P2 + at3 \cdot qm \tag{17}$$

The control point vectors P1 and P2 are reestablished so that the shape of the curve segments expressed by Equation (17) will approximate the input point sequence vectors q1, q2, ..., qm. This generates a continuous free curve.

What needs to be done here is to set the coordinates (x1, y1, z1) of the control point vector P1 and (x2, y2, z2) of the control point vector P2 as unknowns and find them. Since the control point vectors P1 and P2 are temporarily established respectively to the point vector q2 adjacent to the starting point vector q1 and to the point vector qm-1 adjacent to the end point vector qm, Equation (17) is turned into $$R(t) = at0 \cdot q1 + at1 \cdot q2 + at2 \cdot qm-1 + at3 \cdot qm \tag{18}$$

Then the sculptured surface generating device 12 draws perpendiculars from the point vectors q2 through qm-1 to the Bezier curve vector R(t). Every time a perpendicular is drawn from a point vector to the Bezier curve vector R(t), the parameter ti of the intersection point between perpendicular and curve is detected. The parameters ti thus obtained are inserted consecutively in Equation (18). This permits detection of the distance di between each of the point vectors q2 through qm-1 and the corresponding intersection point determined by the parameter ti on the Bezier curve vector R(t).

Given the above measurements, the square-sum S of the distances di is obtained using the equation $$f(x1, y1, z1, x2, y2, z2) \tag{19}$$

$$= \sum_{i=2}^{m-1} di^2$$

$$= \sum_{i=2}^{m-1} \{(R(ti)x - qix)^2 + (R(ti)y - qiy)^2 + (R(ti)z - qiz)^2\}$$

The coordinates (x1, y1, z1) and (x2, y2, z2) of the control point vectors P1 and P2 are determined so as to minimize the square-sum S. If a perpendicular cannot be drawn from the control point vector to the Bezier curve vector R(t), the sculptured surface generating device 12 selects either the starting point vector q1 or the end point vector qm, whichever is the closer, and finds the distance di between the selected point and the control point.

Where Equation (19) is differentiated with respect to six variables x1, y1, z1, x2, y2 and z2, one gets:

$$\frac{df}{dx1} = \sum_{i=2}^{m-1} \left( (R(ti)x - qix) \frac{dR(t)x}{dx1} \right) = 0 \tag{20}$$

$$\frac{df}{dy1} = \sum_{i=2}^{m-1} \left( (R(ti)y - qiy) \frac{dR(t)y}{dy1} \right) = 0 \tag{21}$$

$$\frac{df}{dz1} = \sum_{i=2}^{m-1} \left( (R(ti)z - qiz) \frac{dR(t)z}{dz1} \right) = 0 \tag{22}$$

$$\frac{df}{dx2} = \sum_{i=2}^{m-1} \left( (R(ti)x - qix) \frac{dR(t)x}{dx2} \right) = 0 \tag{23}$$

$$\frac{df}{dy2} = \sum_{i=2}^{m-1} \left( (R(ti)y - qiy) \frac{dR(t)y}{dy2} \right) = 0 \tag{24}$$

$$\frac{df}{dz2} = \sum_{i=2}^{m-1} \left( (R(ti)z - qiz) \frac{dR(t)z}{dz2} \right) = 0 \tag{25}$$

Therefore, if one sets:

$$\frac{dR(t)x}{dx1} = at1 \tag{26}$$

$$\frac{dR(t)y}{dy1} = at1 \tag{27}$$

$$\frac{dR(t)z}{dz1} = at1 \tag{28}$$

$$\frac{dR(t)x}{dx2} = at2 \tag{29}$$

$$\frac{dR(t)y}{dy2} = at2 \tag{30}$$

$$\frac{dR(t)z}{dz2} = at2 \tag{31}$$

and then inserts the above equation (17), one gets:

$$\frac{df}{dx1} = \quad (32)$$

$$\sum_{i=2}^{m-1} \{(at0 \cdot q1x + at1 \cdot x1 + at2 \cdot x2 + at3 \cdot qmx - qix)at1\}$$

$$\frac{df}{dy1} = \quad (33)$$

$$\sum_{i=2}^{m-1} \{(at0 \cdot q1y + at1 \cdot y1 + at2 \cdot y2 + at3 \cdot qmy - qiy)at1\}$$

$$\frac{df}{dz1} = \quad (34)$$

$$\sum_{i=2}^{m-1} \{(at0 \cdot q1z + at1 \cdot z1 + at2 \cdot z2 + at3 \cdot qmz - qiz)at1\}$$

$$\frac{df}{dx2} = \quad (35)$$

$$\sum_{i=2}^{m-1} \{(at0 \cdot q1x + at1 \cdot x1 + at2 \cdot x2 + at3 \cdot qmx - qix)at2\}$$

$$\frac{df}{dy2} = \quad (36)$$

$$\sum_{i=2}^{m-1} \{(at0 \cdot q1y + at1 \cdot y1 + at2 \cdot y2 + at3 \cdot qmy - qiy)at2\}$$

$$\frac{df}{dz2} = \quad (37)$$

$$\sum_{i=2}^{m-1} \{(at0 \cdot q1z + at1 \cdot z1 + at2 \cdot z2 + at3 \cdot qmz - qiz)at2\}$$

Given the above equations, what is then needed is to solve the following simultaneous linear equations with two unknowns:

$$\begin{pmatrix} \sum_{i=2}^{m-1}(at1 \cdot at1) & \sum_{i=2}^{m-1}(at2 \cdot at1) \\ \sum_{i=2}^{m-1}(at1 \cdot at2) & \sum_{i=2}^{m-1}(at2 \cdot at2) \end{pmatrix} \begin{pmatrix} x1 \\ x2 \end{pmatrix} = \quad (38)$$

$$\begin{pmatrix} -\sum_{i=2}^{m-1}(at0 \cdot q1x + at3 \cdot qm - 1x - qix) \cdot at1 \\ -\sum_{i=2}^{m-1}(at0 \cdot q1x + at3 \cdot qm - 1x - qix) \cdot at2 \end{pmatrix}$$

$$\begin{pmatrix} \sum_{i=2}^{m-1}(at1 \cdot at1) & \sum_{i=2}^{m-1}(at2 \cdot at1) \\ \sum_{i=2}^{m-1}(at1 \cdot at2) & \sum_{i=2}^{m-1}(at2 \cdot at2) \end{pmatrix} \begin{pmatrix} y1 \\ y2 \end{pmatrix} = \quad (39)$$

$$\begin{pmatrix} -\sum_{i=2}^{m-1}(at0 \cdot q1y + at3 \cdot qm - 1y - qiy) \cdot at1 \\ -\sum_{i=2}^{m-1}(at0 \cdot q1y + at3 \cdot qm - 1y - qiy) \cdot at2 \end{pmatrix}$$

$$\begin{pmatrix} \sum_{i=2}^{m-1}(at1 \cdot at1) & \sum_{i=2}^{m-1}(at2 \cdot at1) \\ \sum_{i=2}^{m-1}(at1 \cdot at2) & \sum_{i=2}^{m-1}(at2 \cdot at2) \end{pmatrix} \begin{pmatrix} z1 \\ z2 \end{pmatrix} = \quad (40)$$

-continued $$\begin{pmatrix} -\sum_{i=2}^{m-1}(at0 \cdot q1z + at3 \cdot qm - 1z - qiz) \cdot at1 \\ -\sum_{i=2}^{m-1}(at0 \cdot q1z + at3 \cdot qm - 1z - qiz) \cdot at2 \end{pmatrix}$$

After this, the sculptured surface generating device 12 keeps the parameter ti constant and executes the operations of Equations (38) through (40). This furnishes the coordinates (x1, y1, z1) and (x2, y2, z2) of the control point vectors P1 and P2. Then step SP8 is entered.

At this point, the sculptured surface generating device 12 finds the distances between the temporarily established control point vectors P1 and P2 on the one hand and the control point vectors P1 and P2 detected in step SP7 on the other. A check is made to see if the difference in distance between the two corresponding point vectors falls within a predetermined range of tolerance.

If the result of the check in step SP8 is negative, the sculptured surface generating device 12 returns to step SP6. In step SP6, the device 12 again generates the Bezier curve using the control point vectors P1 and P2 found in step SPT. Perpendiculars are drawn from the point vectors q2 through qm-1 to the Bezier curve, and the parameters ti are obtained for the intersection point between each perpendicular and the curve.

The sculptured surface generating device 12 repeats steps SP6, SPT, SP8 and SP6, in that order, in a loop (LOOP1). During that loop, the parameter ti is obtained for the intersection point between each perpendicular drawn from the point vectors q2 through qm-1 to the Bezier curve vector R(t) on the one hand, and the Bezier curve vector R(t) on the other. With the parameter ti held constant, the Bezier curve vector R(t) is generated so as to minimize the square-sum S of the distances di. For the resultant Bezier curve vector R(t), the parameter ti is again acquired and another Bezier curve vector R(t) is likewise generated.

Figure 8:
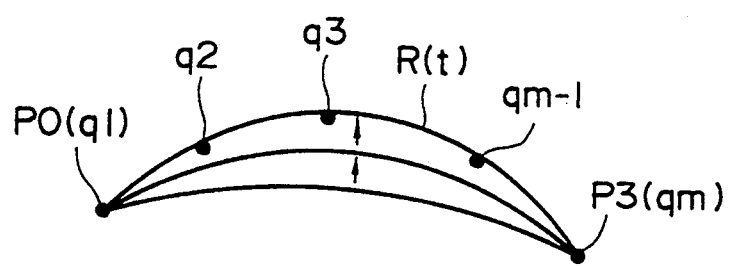
FIG. 8 is a schematic view describing how the Bezier curve is generated repeatedly.

In practice, if a parameter t is used as a variable in a vector function, finding a solution to that function is not easy. By contrast, the embodiment allows the parameter ti to be held constant with respect to the intersection point between each of the perpendiculars from the point vectors q2 through qm-1 to the Bezier curve vector R(t) on the one hand, and the Bezier curve vector R(t) on the other, while the Bezier curve vector R(t) is repeatedly generated. This makes it possible to converge the parameter t to an optimum value relative to each of the point vectors q2 through qm-1 every time the Bezier curve vector R(t) is generated, as shown FIG. 8. The solution is easy to find.

Therefore, repeating the above process generates a free curve approximating the point sequence vectors q1 through qm. That is, inputting segments of the point sequence generates the free curve.

As the fluctuations in the control point vectors P1 and P2 are being reduced through repeated generation of the Bezier curve vector R(t), step SP8 eventually yields an affirmative result. In that case, the sculptured surface generating device 12 goes to step SP9 in which the Bezier curve is generated. Step SP9 is followed by step SP10 in which the process comes to an end.

As described, the starting point and the end point of an input point sequence are first established as nodes. Associated control points are also furnished. A perpendicular is drawn from each input point to a free curve, and the parameter of the intersection point between perpendicular and curve is detected. The control points are reestablished so as to minimize the distance between each point in the point sequence and the intersection point determined by the above parameter on the curve. This readily generates a free curve approximating the point sequence. In this manner, the free curve is generated by simply inputting the point sequence. Thus operating on the inventive method, the sculptured surface generating device is more convenient to use.

(3) Generation of Sculptured Surface

Figure 9:
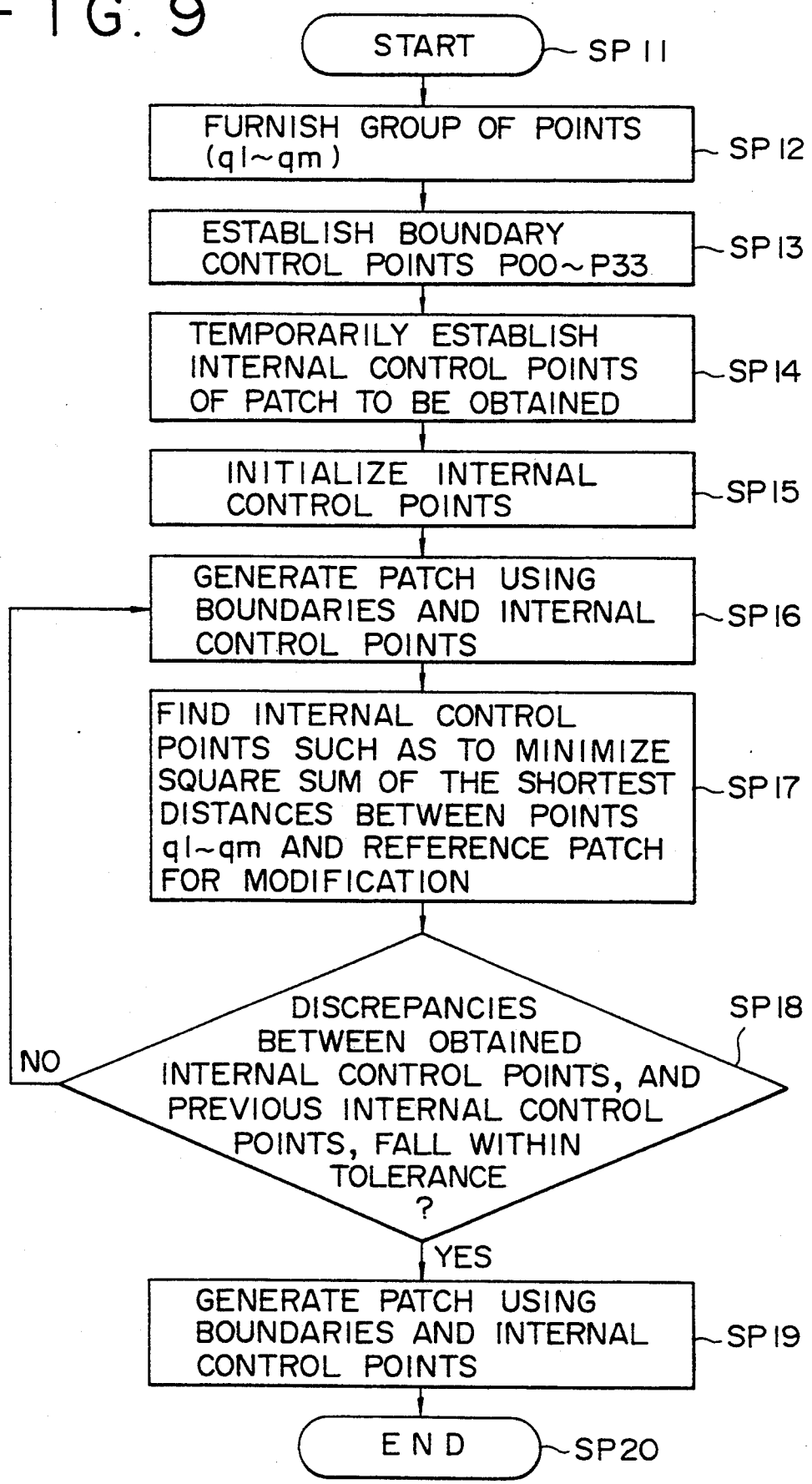
FIG. 9 is a flowchart of steps for generating a sculptured surface.

After a wire frame mode is generated by use of free curves, the sculptured surface generating device 12 carries out the steps of FIG. 9. Using as reference the group of points that the operator has input, the device 12 generates a sculptured surface.

Figure 10:
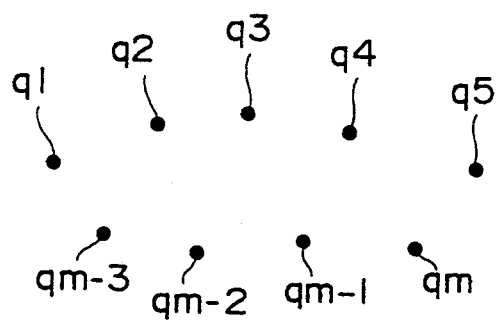
FIG. 10 is a schematic view of a group of points that are input.

In FIG. 9, the sculptured surface generating device 12 is started in step SP11 and goes to step SP12. In step SP12, as depicted in FIG. 10, the device 12 accepts the coordinate data of the point group vectors q1, q1 , . . . , qm that are input by the designer via the input device 17. Step SP12 is followed by step SP13.

In step SP13, as shown in FIG. 11, the sculptured surface generating device 12 establishes the control point vectors P00 through P33 of boundary curves COM1 through COM4 corresponding to the point group vectors q1 through qm. The control point vectors are established as follows. A frame space enclosing the point group vectors q1 through qm is selected for the group of free curves generated by the above-described method for free curve generation. Control point vectors P0 through P3 are selected for the free curves of the frame space. The control point vectors P0 through P3 are then set to P00 through P33.

The sculptured surface generating device 12 goes to step SP14. In step SP14, the device 12 establishes internal control point vectors P11, P12, P21 and P22 in the frame space enclosed by the boundary curves COM1 through COM4.

With this embodiment, as illustrated in FIG. 12, the sculptured surface generating device 12 reestablishes repeatedly the internal control point vectors P11, P12, P21 and P22. This generates the sculptured surface with the shape represented by the input point group vectors q1 through qm.

More specifically, the sculptured surface generating device 12 sets the coordinate data of the internal control point vectors P11, P12, P21 and P22 as (x11, y11, z11), (x12, y12, z12), (x21, y21, z21) and (x22, y22, z22), respectively. These coordinates are selected in such a manner as to keep below a predetermined value the distances to the input point group vectors q1 through qm.

With the internal control point vectors P11, P12, P21 and P22 established, the sculptured surface generating device 12 goes to step SP15. In step SP15, the device 12 initializes the coordinate data (x11, y11, z11), (x12, y12, z12), (x21, y21, z21) and (x22, y22, z22) of the internal control point vectors P11, P12, P21 and P22, respectively.

At this point, the sculptured surface generating device 12 performs the following operations:

$$P11 = P01 + P10 - P00 \quad (41)$$

$$P12 = P02 + P13 - P03 \quad (42)$$

$$P21 = P20 + P31 - P30 \quad (43)$$

$$P22 = P23 + P32 - P33 \quad (44)$$

That is, the coordinate data (x11, y11, z11), (x12, y12, z12), (x21, y21, z21) and (x22, y22, z22) of the internal control point vectors P11, P12, P21 and P22 are initialized in such a manner that a parallelogram will be formed between the internal control point vector P11 and the control point vector P00; between P01 and P10; between P12 and P02; between P13 and P03; between P21 and P20; between P31 and P30; between P22 and P23; and between P32 and P33.

The sculptured surface generating device 12 then goes to step SP16. In step SP16, the device 12 generates the patch vector S(u, v) determined by the control point vectors P00 through P33 and by the internal control point vectors P11 through P22. Step SP16 is followed by step SP17. In step SP17, the sculptured surface generating device 12 finds the square-sum of the shortest distances di between the point group vectors q1 through qm on the one hand and the patch vector S(u, v) on the other.

Figure 13:
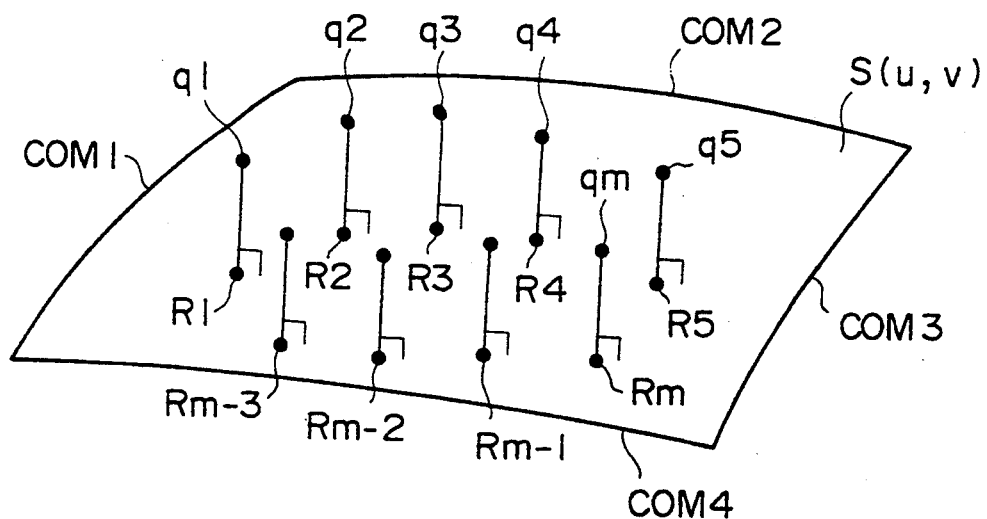
FIG. 13 is a schematic view showing how the distances are found between the group of points and a patch.

That is, as shown in FIG. 13, the sculptured surface generating device 12 draws perpendiculars from the input point vectors q1 through qm to the patch vector S(u, v). With the perpendiculars intersecting the patch, the device 12 finds intersection point vectors R1 through Rm.

Figure 14:
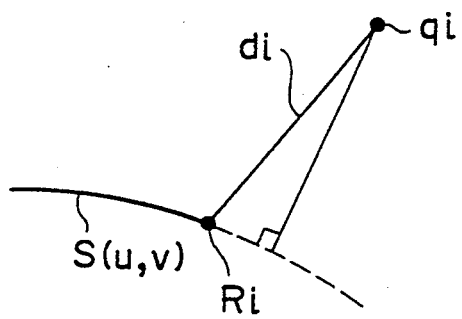
FIG. 14 is a schematic view indicating what is to be done when a perpendicular cannot be drawn from a point to the patch.

Furthermore, the sculptured surface generating device 12 obtains parameters (u1, v1), (u2, v2) , . . . , (um, vm) of the intersection point vectors R1 through Rm on the patch vector S(u, v). As illustrated in FIG. 14, it may happen that a perpendicular drawn from any of the point vectors q1 through qm to the patch vector S(u, v) has no intersection point formed on the latter. In that case, that point on the patch vector S(u, v) which is closest to the point vector in question (q1 - qm) is chosen from among the intersection point vectors R1 through Rm. Then the parameters (u1, v1), (u2, v2) , . . . , (um, vm) of the intersection point vector in question (R1 - Rm) are obtained.

The sculptured surface generating device 12 then performs the operation $$\sum_{i=1}^{m} di^2 = \sum_{i=1}^{m} \{(S(ui,vi)x - qix)^2 + (S(ui,vi)y - qiy)^2 + \quad (45)$$

$$(S(ui,vi)z - qiz)^2\}$$

This is done so as to find the square-sum of the distances di between the intersection point vectors R1 through Rm on the one hand and the corresponding point vectors q1 through qm on the other. In Equation (45), g(ui, vi)x, g(ui, vi)y and g(ui, vi)z (i=from 1 to m) represent the X, Y and Z coordinates of the intersection point vectors R1 through Rm.

The square-sum of the shortest distances di given by Equation (45) may be turned into the following:

$$f(x11,y11,z11,x12,y12,z12,x21,y21,z21,x22,y22,z22) = \sum_{i=1}^{m} di^2 \quad (46)$$

In Equation (46), the square-sum is expressed by use of the coordinates (x11, y11, z11), (x12, y12, z12), (x21, y21, z21) and (x22, y22, z22) of the internal control point vectors P11, P12, P21 and P22 as variables.

As described, the sculptured surface generating device 12 first draws perpendiculars to the patch, and finds the shortest distances between the group of points 5 and the patch. Using the measurements, the sculptured surface generating device 12 establishes the internal control point vectors P11, P12, P21 and P22 so that the function of Equation (46) will have a minimum value. In this manner, the sculptured surface generating device 12 generates the sculptured surface with the shape represented by the input point group vectors q1 through qm.

When Equation (1) is decomposed into the components and Equations (2) and (3) are inserted therein, the patch vector S(u, v) may be expressed by the equation:

$$S(u,v) = (1-u)^3(1-v)^3 P00 + (1-u)^3 3(1-v)^2 v P10 + \quad (47)$$
$$(1-u)^3 3(1-v)v^2 P20 + (1-u)^3 v^3 P30 +$$
$$3(1-u)^2 u(1-v)^3 P01 + 3(1-u)^2 u 3(1-v)^2 v P11 +$$
$$3(1-u)^2 u 3(1-v)v^2 P21 + 3(1-u)^2 u v^3 P31 +$$
$$3(1-u)u^2(1-v)^3 P02 + 3(1-u)u^2 3(1-v)^2 v P12 +$$
$$3(1-u)u^2 3(1-v)v^2 P22 + 3(1-u)u^2 v^3 P32 +$$
$$u^3(1-v)^3 P03 + u^3 3(1-v)^2 v P13 + u^3 3(1-v)v^2 P23 + u^3 v^3 P33$$

If one sets:

$$(1-u)^3(1-v)^3 = drp00 \quad (48)$$
$$3(1-u)^2 u(1-v)^3 = drp01 \quad (49)$$
$$3(1-u)u^2(1-v)^3 = drp02 \quad (50)$$
$$u^3(1-v)^3 = drp03 \quad (51)$$
$$(1-u)^3 3(1-v)^2 v = drp10 \quad (52)$$
$$3(1-u)^2 u 3(1-v)^2 v = drp11 \quad (53)$$
$$3(1-u)u^2 3(1-v)^2 v = drp12 \quad (54)$$
$$u^3 3(1-v)^2 v = drp13 \quad (55)$$
$$(1-u)^3 3(1-v)v^2 = drp20 \quad (56)$$
$$3(1-u)^2 u 3(1-v)v^2 = drp21 \quad (57)$$
$$3(1-u)u^2 3(1-v)v^2 = drp22 \quad (58)$$
$$u^3 3(1-v)v^2 = drp23 \quad (59)$$
$$(1-u)^3 v^3 = drp30 \quad (60)$$
$$3(1-u)^2 u v^3 = drp31 \quad (61)$$
$$3(1-u)u^2 v^3 = drp32 \quad (62)$$
$$u^3 v^3 = drp33 \quad (63)$$

then Equation (47) may be replaced by the equation:

$$S(u,v) = drp00 \cdot P00 + drp10 \cdot P10 + drp20 \cdot P20 + \quad (64)$$
$$drp30 \cdot P30 + drp01 \cdot P01 + drp11 \cdot P11 + drp21 \cdot P21 +$$
$$drp31 \cdot P31 + drp02 \cdot P02 + drp12 \cdot P12 + drp22 \cdot P22 +$$
$$drp32 \cdot P32 + drp03 \cdot P03 + drp13 \cdot P13 + drp23 \cdot P23 +$$
$$drp33 \cdot P33$$

When the function expressed by Equation (64) is differentiated with respect to the coordinate x11 of the internal control point vector P11, the following equation is obtained:

$$\frac{df}{dx11} = \sum_{i=1}^{m} \left\{ (S(ui,vi)x - qix) \frac{dSx}{dx11} \right\} = 0 \quad (65)$$

Since the coordinates (x11, y11, z11), (x12, y12, z12), (x21, y21, z21) and (x22, y22, z22) of the internal control point vectors P11, P12, P21 and P22 are variables, Equation (48) may be turned into the equation:

$$\frac{dSx}{dx11} = drp11 \quad (66)$$

Given the above, inserting Equation (64) turns Equation (65) into the equation:

$$\frac{df}{dx11} = \sum_{i=1}^{m} \{(drp00 \cdot P00x + drp10 \cdot P10x + \quad (67)$$
$$drp20 \cdot P20x + drp30 \cdot P30x + drp01 \cdot P01x + drp11 \cdot x11 +$$
$$drp21 \cdot x21 + drp31 \cdot P31x + drp02 \cdot P02x + drp12 \cdot x12 +$$
$$drp22 \cdot x22 + drp32 \cdot P32x + drp03 \cdot P03x + drp13 \cdot P13x +$$
$$drp23 \cdot P23x + drp33 \cdot P33x - qix) \cdot drp11\}$$

Likewise, the function of Equation (64) is differentiated with respect to the coordinates y11 and z11 of the internal control point vector P11. If one sets:

$$\frac{df}{dy11} = \sum_{i=1}^{m} \left\{ (S(ui,vi)y - qiy) \frac{dSy}{dy11} \right\} = 0 \quad (68)$$

$$\frac{df}{dz11} = \sum_{i=1}^{m} \left\{ (S(ui,vi)z - qiz) \frac{dSz}{dz11} \right\} = 0 \quad (69)$$

$$\frac{dSy}{dy11} = drp11 \quad (70)$$

$$\frac{dSz}{dz11} = drp11 \quad (71)$$

Given the above equations, inserting Equation (64) provides the following relations:

$$\frac{df}{dy11} = \sum_{i=1}^{m} \{(drp00 \cdot P00y + drp10 \cdot P10y + \quad (72)$$
$$drp20 \cdot P20y + drp30 \cdot P30y + drp01 \cdot P01y + drp11 \cdot y11 +$$
$$drp21 \cdot y21 + drp31 \cdot P31y + drp02 \cdot P02y + drp12 \cdot y12 +$$
$$drp22 \cdot y22 + drp32 \cdot P32y + drp03 \cdot P03y + drp13 \cdot P13y +$$
$$drp23 \cdot P23y + drp33 \cdot P33y - qiy) \cdot drp11\}$$

$$\frac{df}{dz11} = \sum_{i=1}^{m} \{(drp00 \cdot P00z + drp10 \cdot P10z + \quad (73)$$

$$drp20 \cdot P20z + drp30 \cdot P30z + drp01 \cdot P01z + drp11 \cdot z11 +$$

$$drp21 \cdot z21 + drp31 \cdot P31z + drp02 \cdot P02z + drp12 \cdot z12 +$$

$$drp22 \cdot z22 + drp32 \cdot P32z + drp03 \cdot P03z + drp13 \cdot P13z +$$

$$drp23 \cdot P23z + drp33 \cdot P33z - qiz) \cdot drp11\}$$

In like manner, if the following equations are set for the coordinates (x12, y12, z12) of the internal control point vector P12;

$$\frac{df}{dx12} = \sum_{i=1}^{m} \left\{ (S(ui,vi)x - qix) \frac{dSx}{dx12} \right\} = 0 \quad (74)$$

$$\frac{df}{dy12} = \sum_{i=1}^{m} \left\{ (S(ui,vi)y - qiy) \frac{dSy}{dy12} \right\} = 0 \quad (75)$$

$$\frac{df}{dz12} = \sum_{i=1}^{m} \left\{ (S(ui,vi)z - qiz) \frac{dSz}{dz12} \right\} = 0 \quad (76)$$

$$\frac{dSx}{dx12} = drp12 \quad (77)$$

$$\frac{dSy}{dy12} = drp12 \quad (78)$$

$$\frac{dSz}{dz12} = drp12 \quad (79)$$

Given the above relations, one gets:

$$\frac{df}{dx12} = \sum_{i=1}^{m} \{(drp00 \cdot P00x + drp10 \cdot P10x + \quad (80)$$

$$drp20 \cdot P20x + drp30 \cdot P30x + drp01 \cdot P01x + drp11 \cdot x11 +$$

$$drp21 \cdot x21 + drp31 \cdot P31x + drp02 \cdot P02x + drp12 \cdot x12 +$$

$$drp22 \cdot x22 + drp32 \cdot P32x + drp03 \cdot P03x + drp13 \cdot P13x +$$

$$drp23 \cdot P23x + drp33 \cdot P33x - qix) \cdot drp12\}$$

$$\frac{df}{dy12} = \sum_{i=1}^{m} \{(drp00 \cdot P00y + drp10 \cdot P10y + \quad (81)$$

$$drp20 \cdot P20y + drp30 \cdot P30y + drp01 \cdot P01y + drp11 \cdot y11 +$$

$$drp21 \cdot y21 + drp31 \cdot P31y + drp02 \cdot P02y + drp12 \cdot y12 +$$

$$drp22 \cdot y22 + drp32 \cdot P32y + drp03 \cdot P03y + drp13 \cdot P13y +$$

$$drp23 \cdot P23y + drp33 \cdot P33y - qiy) \cdot drp12\}$$

$$\frac{df}{dz12} = \sum_{i=1}^{m} \{(drp00 \cdot P00z + drp10 \cdot P10z + \quad (82)$$

$$drp20 \cdot P20z + drp30 \cdot P30z + drp01 \cdot P01z + drp11 \cdot z11 +$$

$$drp21 \cdot z21 + drp31 \cdot P31z + drp02 \cdot P02z + drp12 \cdot z12 +$$

$$drp22 \cdot z22 + drp32 \cdot P32z + drp03 \cdot P03z + drp13 \cdot P13z +$$

$$drp23 \cdot P23z + drp33 \cdot P33z - qiz) \cdot drp12\}$$

Similarly, if the following equations are set for the coordinates (x21, y21, z21) and (x22, y22, z22) of the internal control point vectors P21 and P22;

$$\frac{df}{dx21} = \sum_{i=1}^{m} \left\{ (S(ui,vi)x - qix) \frac{dSx}{dx21} \right\} = 0 \quad (83)$$

$$\frac{df}{dy21} = \sum_{i=1}^{m} \left\{ (S(ui,vi)y - qiy) \frac{dSy}{dy21} \right\} = 0 \quad (84)$$

$$\frac{df}{dz21} = \sum_{i=1}^{m} \left\{ (S(ui,vi)z - qiz) \frac{dSz}{dz21} \right\} = 0 \quad (85)$$

$$\frac{df}{dx22} = \sum_{i=1}^{m} \left\{ (S(ui,vi)x - qix) \frac{dSx}{dx22} \right\} = 0 \quad (86)$$

$$\frac{df}{dy22} = \sum_{i=1}^{m} \left\{ (S(ui,vi)y - qiy) \frac{dSy}{dy22} \right\} = 0 \quad (87)$$

$$\frac{df}{dz22} = \sum_{i=1}^{m} \left\{ (S(ui,vi)z - qiz) \frac{dSz}{dz22} \right\} = 0 \quad (88)$$

then the following relations are provided:

$$\frac{dSx}{dx21} = drp21 \quad (89)$$

$$\frac{dSy}{dy21} = drp21 \quad (90)$$

$$\frac{dSz}{dz21} = drp21 \quad (91)$$

$$\frac{dSx}{dx22} = drp22 \quad (92)$$

$$\frac{dSy}{dy22} = drp22 \quad (93)$$

$$\frac{dSz}{dz22} = drp22 \quad (94)$$

Given the above relations, one gets:

$$\frac{df}{dx21} = \sum_{i=1}^{m} \{(drp00 \cdot P00x + drp10 \cdot P10x + \quad (95)$$

$$drp20 \cdot P20x + drp30 \cdot P30x + drp01 \cdot P01x + drp11 \cdot x11 +$$

$$drp21 \cdot x21 + drp31 \cdot P31x + drp02 \cdot P02x + drp12 \cdot x12 +$$

$$drp22 \cdot x22 + drp32 \cdot P32x + drp03 \cdot P03x + drp13 \cdot P13x +$$

$$drp23 \cdot P23x + drp33 \cdot P33x - qix) \cdot drp21\}$$

$$\frac{df}{dy21} = \sum_{i=1}^{m} \{(drp00 \cdot P00y + drp10 \cdot P10y + \quad (96)$$

$$drp20 \cdot P20y + drp30 \cdot P30y + drp01 \cdot P01y + drp11 \cdot y11 +$$

$$drp21 \cdot y21 + drp31 \cdot P31y + drp02 \cdot P02y + drp12 \cdot y12 +$$

$$drp22 \cdot y22 + drp32 \cdot P32y + drp03 \cdot P03y + drp13 \cdot P13y +$$

$$drp23 \cdot P23y + drp33 \cdot P33y - qiy) \cdot drp21\}$$

$$\frac{df}{dz21} = \sum_{i=1}^{m} \{(drp00 \cdot P00z + drp10 \cdot P10z + \qquad (97)$$
$$drp20 \cdot P20z + drp30 \cdot P30z + drp01 \cdot P01z + drp11 \cdot z11 +$$
$$drp21 \cdot z21 + drp31 \cdot P31z + drp02 \cdot P02z + drp12 \cdot z12 +$$
$$drp22 \cdot z22 + drp32 \cdot P32z + drp03 \cdot P03z + drp13 \cdot P13z +$$
$$drp23 \cdot P23z + drp33 \cdot P33z - qiz) \cdot drp21\}$$

$$\frac{df}{dx22} = \sum_{i=1}^{m} \{(drp00 \cdot P00x + drp10 \cdot P10x + \qquad (98)$$
$$drp20 \cdot P20x + drp30 \cdot P30x + drp01 \cdot P01x + drp11 \cdot x11 +$$
$$drp21 \cdot x21 + drp31 \cdot P31x + drp02 \cdot P02x + drp12 \cdot x12 +$$
$$drp22 \cdot x22 + drp32 \cdot P32x + drp03 \cdot P03x + drp13 \cdot P13x +$$
$$drp23 \cdot P23x + drp33 \cdot P33x - qix) \cdot drp22\}$$

$$\frac{df}{dy22} = \sum_{i=1}^{m} \{(drp00 \cdot P00y + drp10 \cdot P10y + \qquad (99)$$
$$drp20 \cdot P20y + drp30 \cdot P30y + drp01 \cdot P01y + drp11 \cdot y11 +$$
$$drp21 \cdot y21 + drp31 \cdot P31y + drp02 \cdot P02y + drp12 \cdot y12 +$$
$$drp22 \cdot y22 + drp32 \cdot P32y + drp03 \cdot P03y + drp13 \cdot P13y +$$
$$drp23 \cdot P23y + drp33 \cdot P33y - qiy) \cdot drp22\}$$

$$\frac{df}{dz22} = \sum_{i=1}^{m} \{(drp00 \cdot P00z + drp10 \cdot P10z + \qquad (100)$$
$$drp20 \cdot P20z + drp30 \cdot P30z + drp01 \cdot P01z + drp11 \cdot z11 +$$
$$drp21 \cdot z21 + drp31 \cdot P31z + drp02 \cdot P02z + drp12 \cdot z12 +$$
$$drp22 \cdot z22 + drp32 \cdot P32z + drp03 \cdot P03z + drp13 \cdot P13z +$$
$$drp23 \cdot P23z + drp33 \cdot P33z - qiz) \cdot drp22\}$$

If one sets:

$$\sum_{i=1}^{m} \{(drp00 \cdot P00x + drp10 \cdot P10x + \qquad (101)$$
$$drp20 \cdot P20x + drp30 \cdot P30x + drp01 \cdot P01x + drp11 \cdot x11 +$$
$$drp21 \cdot x21 + drp31 \cdot P31x + drp02 \cdot P02x + drp12 \cdot x12 +$$
$$drp22 \cdot x22 + drp32 \cdot P32x + drp03 \cdot P03x + drp13 \cdot P13x +$$
$$drp23 \cdot P23x + drp33 \cdot P33x - qix) \cdot drp11\} = \Sigma Kix$$

then Equations (67), (80), (95) and (98) may be represented in the following matrix format:

$$\begin{pmatrix} \Sigma(drp11 \cdot drp11) & \Sigma(drp21 \cdot drp11) & \Sigma(drp12 \cdot drp11) \\ \Sigma(drp11 \cdot drp21) & \Sigma(drp21 \cdot drp21) & \Sigma(drp12 \cdot drp21) \\ \Sigma(drp11 \cdot drp12) & \Sigma(drp21 \cdot drp12) & \Sigma(drp12 \cdot drp12) \\ \Sigma(drp11 \cdot drp22) & \Sigma(drp21 \cdot drp22) & \Sigma(drp12 \cdot drp22) \end{pmatrix} \qquad (102)$$

$$\begin{pmatrix} \Sigma(drp22 \cdot drp11) \\ \Sigma(drp22 \cdot drp21) \\ \Sigma(drp22 \cdot drp12) \\ \Sigma(drp22 \cdot drp22) \end{pmatrix} \begin{pmatrix} x11 \\ x21 \\ x12 \\ x22 \end{pmatrix} = \begin{pmatrix} -\Sigma Kix \cdot drp11 \\ -\Sigma Kix \cdot drp21 \\ -\Sigma Kix \cdot drp12 \\ -\Sigma Kix \cdot drp22 \end{pmatrix}$$

Likewise, if one sets:

$$\sum_{i=1}^{m} \{(drp00 \cdot P00y + drp10 \cdot P10y + \qquad (103)$$
$$drp20 \cdot P20y + drp30 \cdot P30y + drp01 \cdot P01y + drp11 \cdot y11 +$$
$$drp21 \cdot y21 + drp31 \cdot P31y + drp02 \cdot P02y + drp12 \cdot y12 +$$
$$drp22 \cdot y22 + drp32 \cdot P32y + drp03 \cdot P03y + drp13 \cdot P13y +$$
$$drp23 \cdot P23y + drp33 \cdot P33y - qiy) \cdot drp11\} = \Sigma Kiy$$

$$\sum_{i=1}^{m} \{(drp00 \cdot P00z + drp10 \cdot P10z + \qquad (104)$$
$$drp20 \cdot P20z + drp30 \cdot P30z + drp01 \cdot P01z + drp11 \cdot z11 +$$
$$drp21 \cdot z21 + drp31 \cdot P31z + drp02 \cdot P02z + drp12 \cdot z12 +$$
$$drp22 \cdot z22 + drp32 \cdot P32z + drp03 \cdot P03z + drp13 \cdot P13z +$$
$$drp23 \cdot P23z + drp33 \cdot P33z - qiz) \cdot drp11\} = \Sigma Kiz$$

then Equations (72), (81), (96) and (99) and Equations (73), (82), (97) and (100) may be represented in the following matrix formats:

$$\begin{pmatrix} \Sigma(drp11 \cdot drp11) & \Sigma(drp21 \cdot drp11) & \Sigma(drp12 \cdot drp11) \\ \Sigma(drp11 \cdot drp21) & \Sigma(drp21 \cdot drp21) & \Sigma(drp12 \cdot drp21) \\ \Sigma(drp11 \cdot drp12) & \Sigma(drp21 \cdot drp12) & \Sigma(drp12 \cdot drp12) \\ \Sigma(drp11 \cdot drp22) & \Sigma(drp21 \cdot drp22) & \Sigma(drp12 \cdot drp22) \end{pmatrix} \qquad (105)$$

$$\begin{pmatrix} \Sigma(drp22 \cdot drp11) \\ \Sigma(drp22 \cdot drp21) \\ \Sigma(drp22 \cdot drp12) \\ \Sigma(drp22 \cdot drp22) \end{pmatrix} \begin{pmatrix} x11 \\ x21 \\ x12 \\ x22 \end{pmatrix} = \begin{pmatrix} -\Sigma Kiy \cdot drp11 \\ -\Sigma Kiy \cdot drp21 \\ -\Sigma Kiy \cdot drp12 \\ -\Sigma Kiy \cdot drp22 \end{pmatrix}$$

$$\begin{pmatrix} \Sigma(drp11 \cdot drp11) & \Sigma(drp21 \cdot drp11) & \Sigma(drp12 \cdot drp11) \\ \Sigma(drp11 \cdot drp21) & \Sigma(drp21 \cdot drp21) & \Sigma(drp12 \cdot drp21) \\ \Sigma(drp11 \cdot drp12) & \Sigma(drp21 \cdot drp12) & \Sigma(drp12 \cdot drp12) \\ \Sigma(drp11 \cdot drp22) & \Sigma(drp21 \cdot drp22) & \Sigma(drp12 \cdot drp22) \end{pmatrix} \qquad (106)$$

$$\begin{pmatrix} \Sigma(drp22 \cdot drp11) \\ \Sigma(drp22 \cdot drp21) \\ \Sigma(drp22 \cdot drp12) \\ \Sigma(drp22 \cdot drp22) \end{pmatrix} \begin{pmatrix} x11 \\ x21 \\ x12 \\ x22 \end{pmatrix} = \begin{pmatrix} -\Sigma Kiz \cdot drp11 \\ -\Sigma Kiz \cdot drp21 \\ -\Sigma Kiz \cdot drp12 \\ -\Sigma Kiz \cdot drp22 \end{pmatrix}$$

Given the variables independent of one another, solving three simultaneous linear equations with four unknowns each establishes the coordinates (x11, y11, z11), (x12, y12, z12), (x21, y21, z21) and (x22, 722, z22) of the internal control point vectors P11, P12, P21 and P22.

By performing the operations of Equations (102), (105) and (106), the sculptured surface generating device 12 finds the coordinates (x11, y11, z11), (x12, y12, z12), (x21, y21, z21) and (x22, y22, z22). After this, the device 12 goes to step SP18.

In step SP18, the sculptured surface generating device 12 checks to see if the differences between the above-detected coordinates (x11, y11, z11), (x12, y12, z12), (x21, y21, z21) and (x22, y22, z22) on the one hand, and the coordinates (x11, y11, z11), (x12, y12, z12), (x21, y21, z21) and (x22, y22, z22) generated in step SP16 for the internal control point vectors P11 through P22 on the other, fall within tolerance.

If the result of the check in steps SP18 is negative, the sculptured surface generating device 12 returns to step SP16. In step SP16, the device 12 generates the patch vector S(u, v) based on the detected coordinates (x11, y11, z11), (x12, y12, z12), (x21, y21, z21) and (x22, y22, z22) of the internal control point vectors P11 through P22. The sculptured surface generating device 12 then goes to step SP17.

Figure 15:
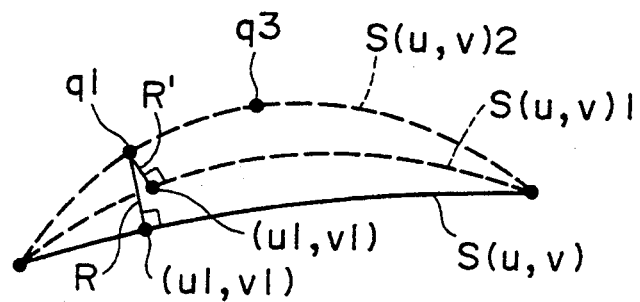
FIG. 15 is a schematic view describing how the patch may be modified.

In step SP17, as shown in FIG. 15, the sculptured surface generating device 12 draws perpendiculars to the patch vector S(u, v) to set the parameters u and v corresponding to the given point group vectors q1 through qm. The sculptured surface generating device 12 then establishes the internal control point vectors P11 through P22 so as to minimize the distances di between the point vectors q1 through qm on the one hand, and those point vectors R1 through Rm on the patch vector S(u, v) which are determined by the parameters u and v.

The internal control point vectors P11 through P22 thus established are used to generate a patch vector $S(u, v)1$. Perpendiculars are drawn to the patch vector $S(u, v)1$ to establish the parameters u and v. The internal control point vectors P11 through P22 are established so that the distances di will be minimized between those point vectors R1 through Rm on the patch vector $S(u, v)1$ which are determined by the parameters u and v on the one hand, and the point vectors q1 through qm on the other.

Steps SP16, SP17, SP18 and SP16 are executed repeatedly to modify the patch vector S(u, v). Through such modification, the sculptured surface generating device 12 generates the sculptured surface having the shape represented by the input point group vectors q1 through qm.

When the result of the check in step SP18 becomes affirmative, step SP19 is reached. In step SP19, the patch vector S(u, v) is generated anew by use of the above-detected coordinates (x11, y11, z11), (x12, y12, z12), (x21, y21, z21) and (x22, y22, z22) of the internal control point vectors P11 through P22. Step SP19 is followed by step SP20 in which the process is terminated. Because a sculptured surface is easy to generate by entry of a group of points, the sculptured surface generating device 12 becomes more convenient to use.

Figure 16:
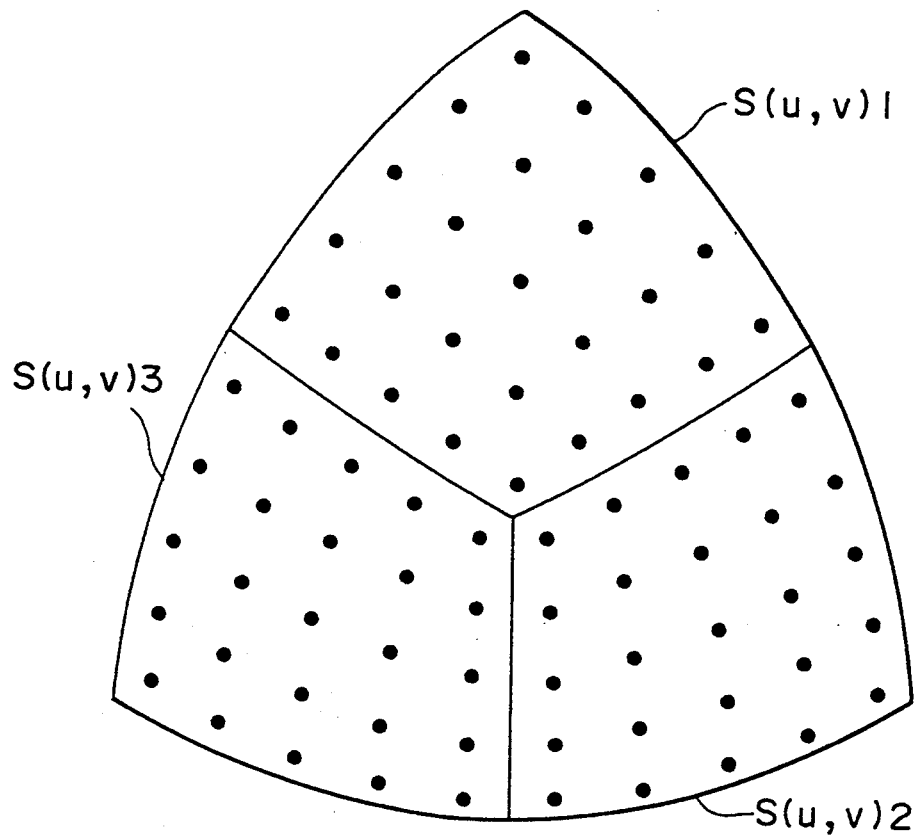
FIG. 16 is a schematic view depicting how point groups are actually input.
Figure 17:
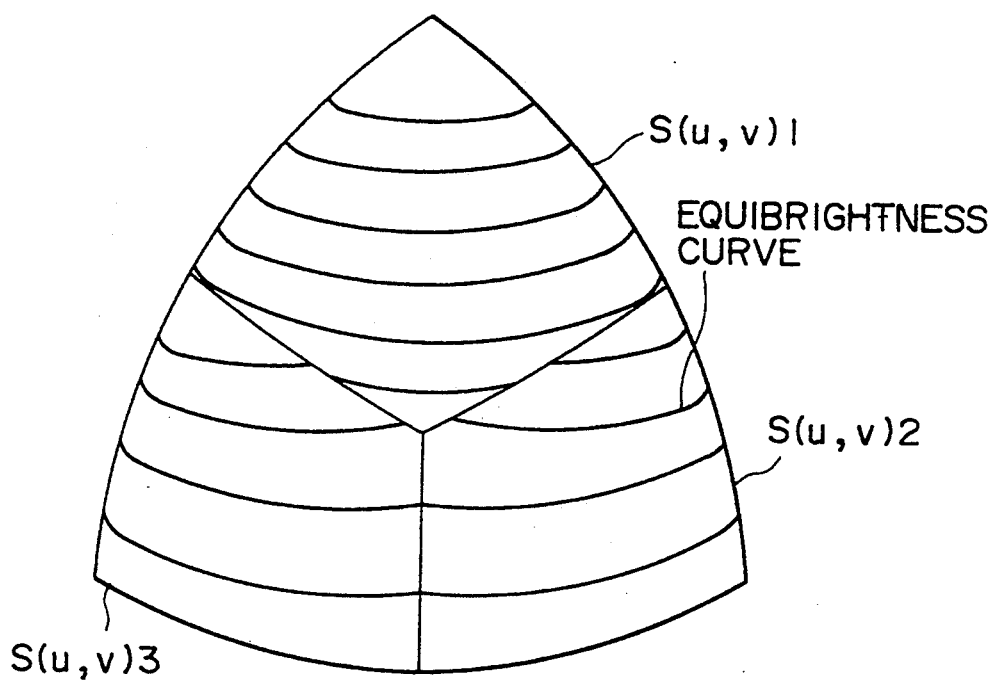
FIG. 17 is a schematic view illustrating patches immediately after they are established.
Figure 18:
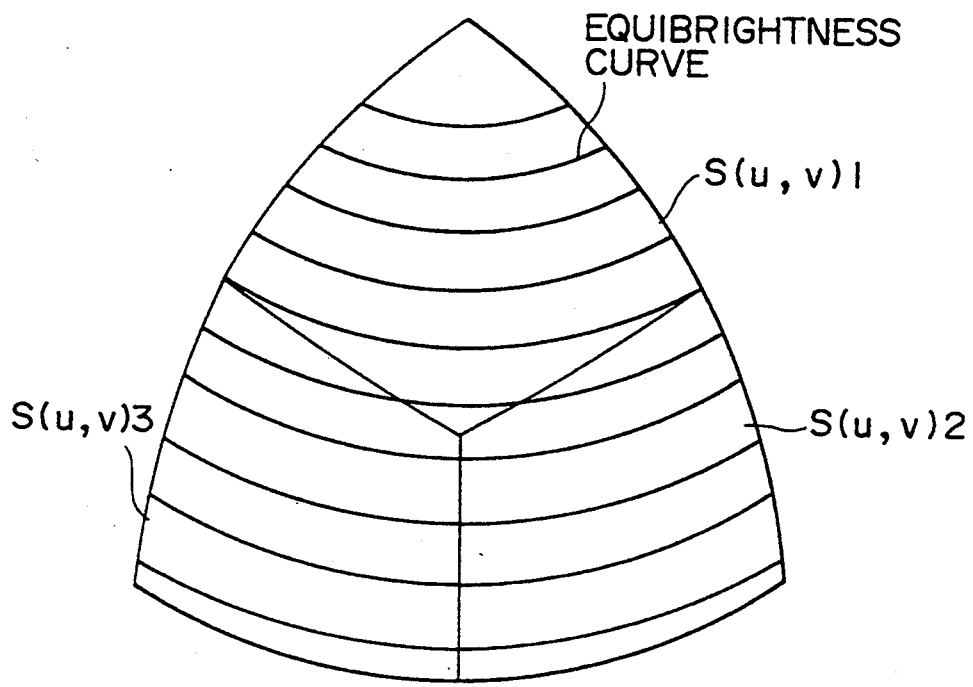
FIG. 18 is a schematic view showing the patches as they are finalized in shape.

Suppose that in practice, as illustrated in FIG. 16, three patch vectors $S(u, v)1$, $S(u, v)2$ and $S(u, v)3$ are generated by entry of the coordinates of a one-eighth spherical surface. In that case, as shown in FIGS. 17 and 18, the patch vectors $S(u, v)1$, $S(u, v)2$ and $S(u, v)3$ having significant initial discrepancies with respect to the input group of points are gradually modified to approximate that point group. Eventually the patch vectors are modified to approximate a spherical sphere very closely.

When the patches are temporarily generated in the manner above, perpendiculars are drawn from the input group of points to the patches. The internal control points within each patch are established in such a manner as to minimize the square-sum of the lengths of those perpendiculars. This generates a patch closely approximating the point group in question. With a desired sculptured surface generated by entry of a given group of points, the sculptured surface generating device becomes more convenient to use.

(4) Modification of Sculptured Surface

Figure 19:
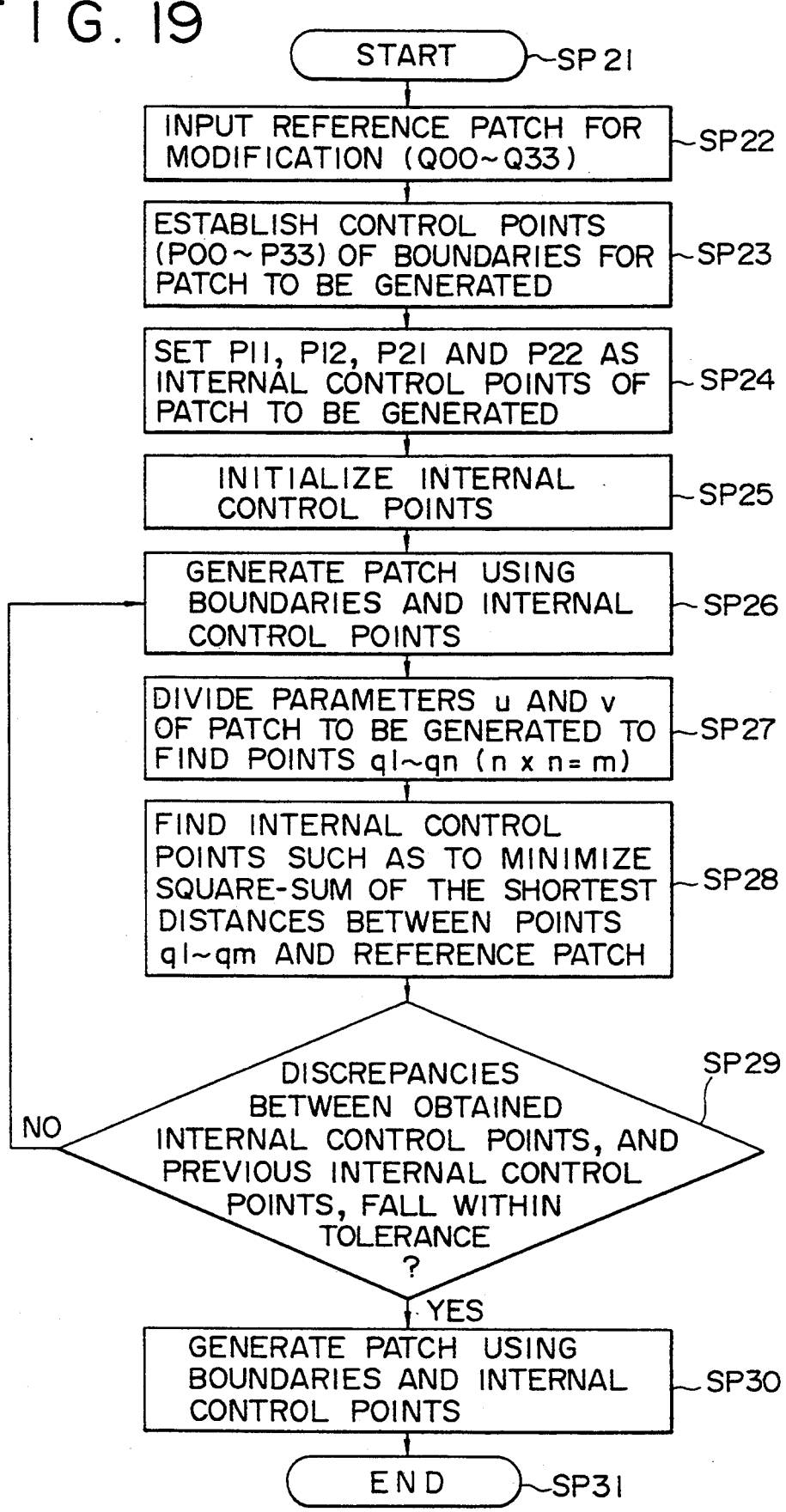
FIG. 19 is a flowchart of steps for dividing and modifying the patch.

When patches are generated within frame spaces, one of the patches may be excessively large relative to the remaining patches. In that case, the sculptured surface generating device 12 carries out the steps of FIG. 19 in response to the operator's action. The patch in question is generated in a frame space established anew by the operator. Then the patch is modified into the original surface shape.

The sculptured surface generating device 12 is started in step SP21 and goes to step SP22. In step SP22, the sculptured surface generating device 12 admits the data of the patch vector S(u, v)M located in the frame space in question.

Figure 20:
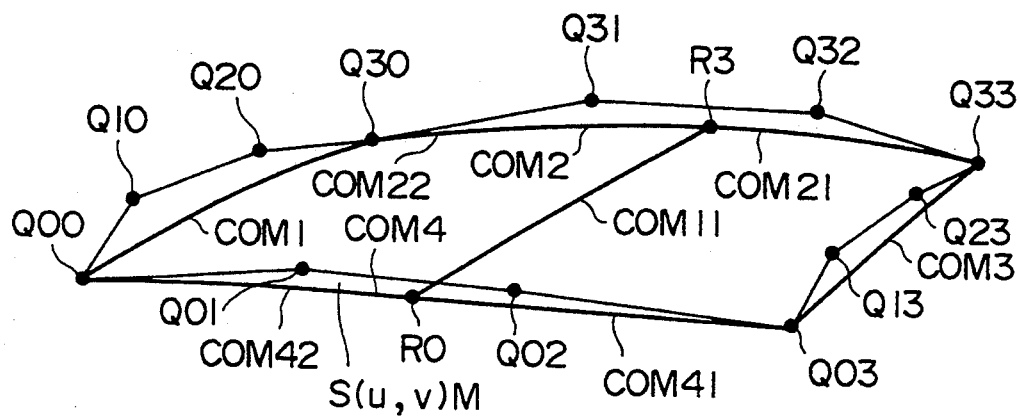
FIG. 20 is a schematic view of the patch to be divided.

More specifically, as depicted in FIG. 20, the sculptured surface generating device 12 accepts the coordinate data of the node vectors Q00, Q30, Q03 and Q33 and the control point vectors Q01, Q02, Q10, Q20, Q31, Q32, Q13 and Q23 regarding the patch vector S(u, v)M. Step SP22 is followed by step SP23. In step SP23, the sculptured surface generating device 12 generates the curve data about the frame space established anew by the operator.

The curve data are generated in step SP23 as follows. Using the sculptured surface generating device 12, a digitizer or the like, the operator first designates point vectors P3 and P0 on boundary curves COM2 and COM4. The point vectors P3 and P3 are established as nodes. The boundary curves COM2 and COM4 are divided by the point vectors P0 and P3 so as to reestablish the parameters and internal control points involved. This splits the boundary curve COM2 into two boundary curves COM21 and COM41, and the COM4 into another two boundary curves COM22 and COM42.

The sculptured surface generating device 12 then generates a free curve that connects the point vectors P0 and P3, and establishes the free curve to the boundary curve COM11. Then the sculptured surface generating device 12 divides the frame space enclosed by the boundary curves COM1 through COM4 into two frame spaces, one enclosed by the boundary curves COM1, COM22, COM11 and COM42, and the other by COM11, COM21, COM3 and COM41.

The boundary curves COM21, COM41, COM22 and COM42 are generated as follows. The sculptured surface generating device 12 generates a point sequence on the boundary curves COM2 and COM4. This point sequence is subjected to the above-described process of FIG. 9. This generates the boundary curves COM21, COM41, COM22 and COM42 following the shape of the initial boundary curves COM2 and COM4.

The boundary curve COM11 is generated in like manner as follows. The sculptured surface generating device generates a point sequence on the patch vector S(u, v)M connecting the point vectors P0 and P3. This point sequence is subjected to the above-described process of FIG. 9. This generates the boundary curve COM11 following the initial surface shape of the patch vector S(u, v)M.

Figure 21:
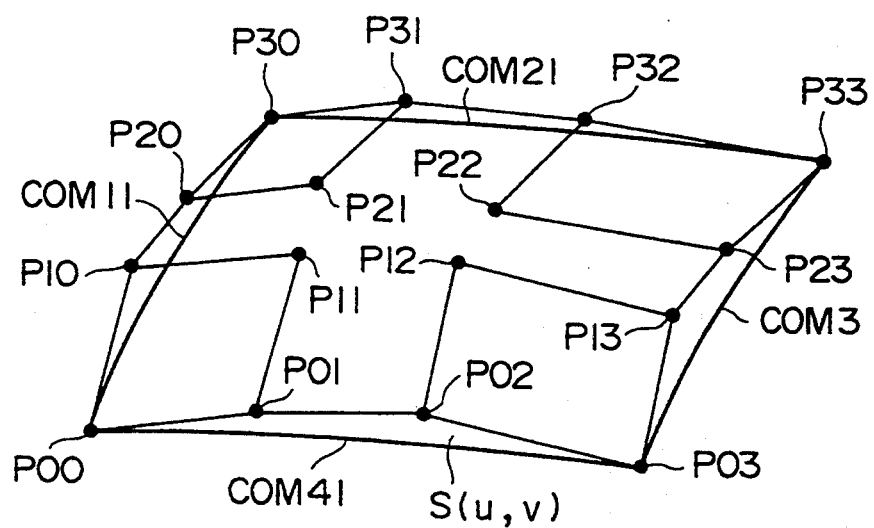
FIG. 21 is a schematic view of the patch to be modified.

The sculptured surface generating device 12 then goes to step SP24. In step SP24, as shown in FIG. 21, the internal control point vectors P11, P12, P21 and P22 are established for the frame space enclosed by the boundary curves COM3, COM21, COM11 and COM41. The sculptured surface generating device 12 repeatedly establishes anew these internal control point vectors P11, P12, P21 and P22. In doing so, the sculptured surface generating device 12 generates a new patch S(u, v) whose shape eventually approximates the surface shape of the initial patch vector S(u, v)M.

Step SP24 is followed by step SP25. In step SP25, the sculptured surface generating device 12 performs the operations of Equations (41) through (44). This initializes the coordinate data (x11, y11, z11), (x12, y12, z12), (x21, y21, z21) and (x22, y22, z22) of the internal control point vectors P11, P12, P21 and P22.

Figure 22:
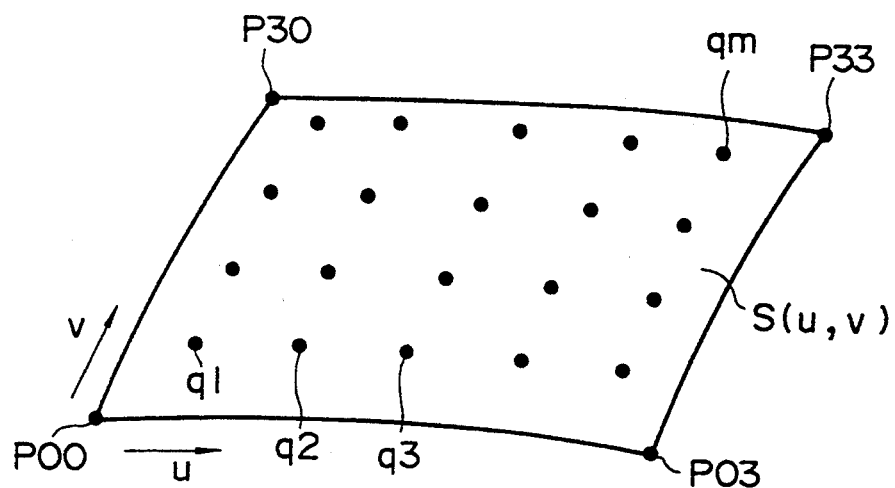
FIG. 22 is a schematic view of the group of points established on the patch.

The sculptured surface generating device 12 then goes to step SP26. In step SP26, the device 12 generates the patch vector S(u, v) determined by the internal control point vectors P11 through P22 and by the boundary curves COM11, GOM21, GOM3 and COM41. Step SP26 is followed by step SP27. In step SP27, as depicted in FIG. 22, the sculptured surface generating device 12 divides the parameters u and v of the patch vector S(u, v) into n parts (n=10 in this case). A total of 9×9 point vectors q1 through qm (m=81) are established on the patch vector S(u, v).

Figure 23:
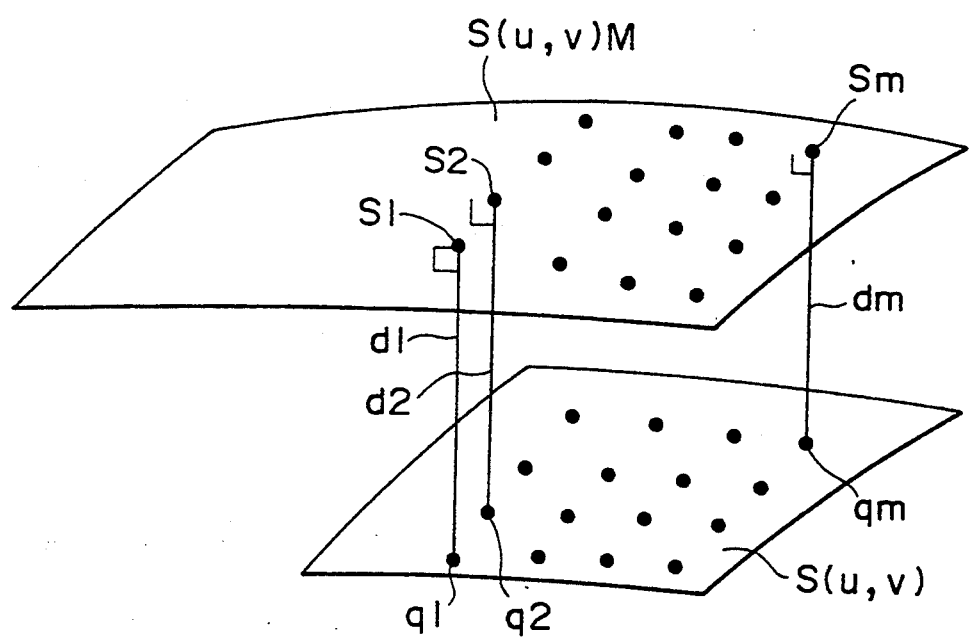
FIG. 23 is a schematic view describing how distances are found between the group of points and the patch.

The sculptured surface generating device 12 then goes to step SP28. In step SP28, as illustrated in FIG. 23, perpendiculars are drawn from the point vectors q1 through qm on the patch vector S(u, v) to the patch vector S(u, v)M which is the target patch for modification. With the perpendiculars intersecting the patch vector S(u, v)M, the sculptured surface generating device 12 finds intersection point vectors S1 through Si for each perpendicular.

Furthermore, the sculptured surface generating device 12 finds the distances di between the point vectors q1 through qm on the one hand and their corresponding intersection point vectors S1 through Sm on the other. With the measurements taken, the sculptured surface generating device 12 obtains the shortest distances between the point vectors q1 through qm established on the patch vector S(u, v) on the one hand, and the patch vector S(u, v)M on the other.

At this point, it may happen that a perpendicular drawn from any of the point vectors q1 through qm to the patch vector S(u, v)M fails to intersect the latter. (In the above case, the frame space is generated through patch division and thus the perpendiculars from all point vectors q1 through qm intersect the patch vector S(u, v)M.) If the perpendicular fails to be formed, the point closest to the patch vector S(u, v)M is set as the intersection point vector qm. By use of that intersection point vector qm, the distances di are acquired for the point vectors R1 through Rm.

With the distances di thus obtained, the sculptured surface generating device 12 finds the square-sum of these distances and reestablishes the internal control point vectors P11, P12, P21 and P22 in such a way that the square-sum will be minimized. Specifically, the sculptured surface generating device 12 substitutes, in Equation (45), the coordinates S(u, v)x, S(u, v)y and S(u, v)z representing the point vector qi on the patch vector S(u, v) for the coordinates S(u, v)x, S(u, v)y and S(u, v)z representing the intersection point vector Ri. That is, the coordinates qix, qiy and qiz representing each input point vector qi are replaced by the coordinates S(u, v)Mx, S(u, v)My and S(u, v)Mz of the intersection point vectors S1 through Sm. This allows the square-sum of the distances di to be calculated.

Thus by operating on Equations (47) through (106) in the above manner, the sculptured surface generating device 12 finds the internal control point vectors P11, P12, P21 and P22 which minimize the square-sum of the distances di.

After the internal control point vectors P11, P12, P21 and P22 are found as described, the sculptured surface generating device 12 goes to step SP29. In step SP29, a check is made to see if the discrepancies between the above-detected coordinates (x11, y11, z11) through (x22, y22, z22) of the internal control point vectors P11 through P22 on the one hand, and the coordinates (x11, y11, z11) through (x22, y22, z22) generated in step SP26 for the internal control point vectors P11 through P22 on the other, fall within tolerance.

If the result of the check in step SP29 is negative, the sculptured surface generating device 12 returns to step SP26. In step SP26, the device generates the patch vector S(u, v) anew using the detected coordinates (x11, y11, z11) through (x22, y22, z22) of the internal control point vectors P11 through P22. Step SP26 is followed by step SP27.

The sculptured surface generating device 12 repeats steps SP26, SP27, SP28, SP29 and SP26, in that order, so that the patch vector S(u, v) will gradually approximate through modification the surface shape of the initial patch vector S(u, v)M. Eventually, the approximation leads to the result of the check in step SP29 becoming affirmative. In that case, step SP29 is followed by step SP30 in which the patch vector S(u, v) having the finalized shape is generated. Then step SP31 is reached in which the process comes to an end.

In like manner, the sculptured surface generating device 12 generates a patch approximating each of the initial patches in the remaining frame spaces. Thus when a patch is divided, the initial surface shape thereof will be maintained.

Figure 24:
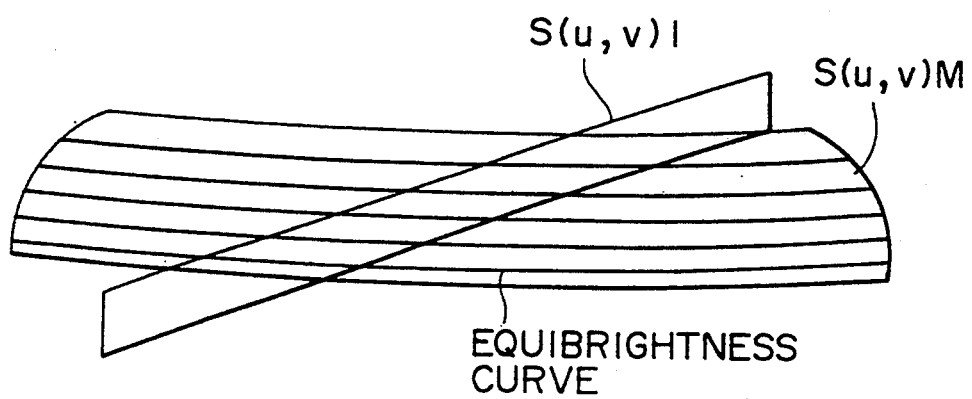
FIG. 24 is a schematic view depicting how the patch is actually divided for modification.
Figure 25:
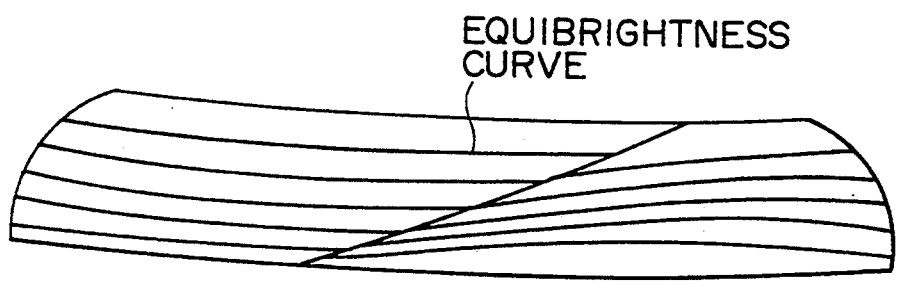
FIG. 25 is a schematic view showing the patch immediately after it is divided.

As illustrated in FIG. 24, an experiment was conducted in which a patch vector S(u, v)M having a circular section was divided by a plane S(u, v1)1. In the experiment, as shown in FIG. 25, merely establishing internal control point vectors P11 through P22 failed to furnish a naturally varied surface along the division. The equi-brightness curves involved also differed from what they had been initially.

Figure 26:
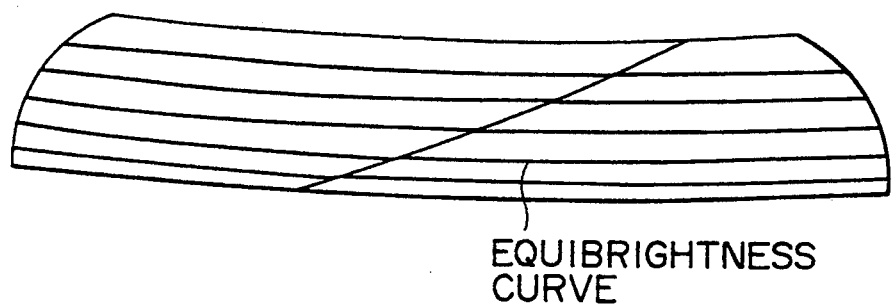
FIG. 26 is a schematic view indicating the patch as it is finalized in shape.
Figure 27:
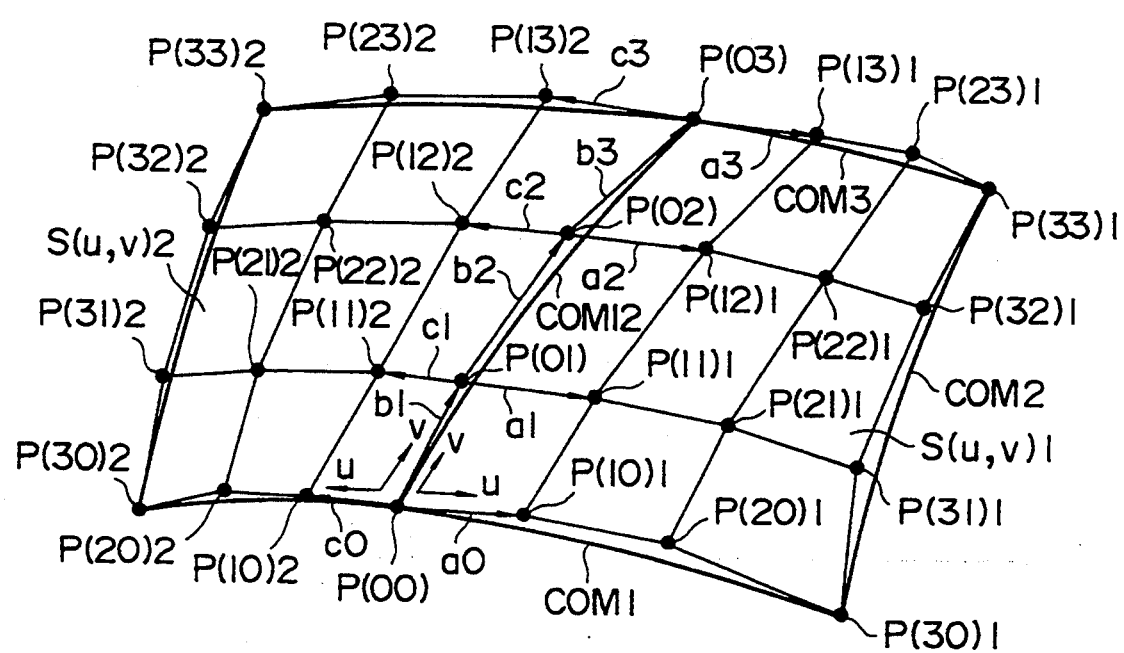
FIG. 27 is a schematic view describing how a sculptured surface is generated.

By contrast, as depicted in FIG. 26, the embodiment of the invention involves carrying out the above-described process to modify the divided patches so that the initial surface shape of the patch vector S(u, v)M will be reproduced virtually intact.

When a patch is temporarily generated, perpendiculars are drawn from a group of points on that patch to a target patch for modification. Internal control points are established within the patch so that the square-sum of the lengths of the perpendiculars will be minimized. This allows the patch in question to approximate the target patch in surface shape. Because the frame space may be reestablished as needed, the sculptured surface generating device is more convenient to use than ever.

(5) Effects of the Embodiment

As described and according to the invention, a starting point and an end point of an input sequence of points are first established as nodes. Perpendiculars are drawn from the input points to a free curve to form intersection points on the latter. With the parameters of the intersection points obtained, control points are repeatedly established so as to minimize the distances between the points in the point sequence and the intersection points determined by the parameters. This permits easy generation of a free curve approximating the point sequence.

Furthermore, a patch is temporarily generated, and internal control points are established within the patch. These internal control points are established so that the square-sum of the lengths of the perpendiculars drawn from an input group of points to the patch will be minimized. In this manner, a desired free curve is generated by entry of a given group of points.

Conversely, a group of points may be established on a temporarily established patch. Perpendiculars are drawn from that point of groups to a target patch for modification. Internal control points are established in the initial patch in such a manner that the square-sum of the lengths of the perpendiculars will be minimized. This allows the patch in question to approximate the target patch in terms of surface shape.

In this manner, free curves and sculptured surfaces are generated by entry of point sequences and point groups. A generated sculptured surface may be modified as needed. This makes the sculptured surface generating device more convenient to use than ever.

(6) Other Embodiments

The above description has centered on the preferred embodiment that allows free curves to be generated by entry of point sequences, whereby a wire frame model is created. However, the invention is not limited to the above-described embodiment and may be applied to other setups whereby free curves are generated as needed.

The above-described embodiment is used primarily to generate patches by use of point groups entered by the operator. Alternatively, the invention may be adapted illustratively to generate an offset or fillet surface prepared by the designing apparatus for surface cutting.

Where an offset surface is to be generated, points as a group are located consecutively by half the tool diameter away from the initial surface. Then this group of points is used to generate patches. This provides a closely approximated offset surface.

Where a fillet surface is to be generated, the data about the initial surface are operated on to furnish a group of points representing a fillet surface. This point group is then used to generate patches. This permits easy generation of the fillet surface.

Such operations are carried out to generate groups of points which in turn are used to generate patches. This makes it possible to generate spheres, cylinders and other geometrical shapes with ease.

Furthermore, according to the invention, the data from a three-dimensional measuring device or the like may be used to generate the external shape of an object under measurement.

The above-described preferred embodiment emphasizes establishing a group of points on a patch so as to divide the patch into parts whereby the initial surface shape is reproduced. Alternatively, where a plurality of patches are to be replaced with a single patch, the invention may be adapted illustratively to express a sticker stuck on a desired surface.

As described and according to the invention, a starting point and an end point of a point sequence are established as nodes, whereby a free curve is temporarily set up. Then perpendiculars are drawn from the points to the free curve. With the perpendiculars intersecting the curve, parameters for such intersection points are detected. Control points are established repeatedly so as to minimize the distances between the points in the point sequence and the intersection points determined by the parameters on the free curve. This permits easy generation of a free curve approximating the point sequence.

The coordinates of a plurality of points are used to detect the shortest distances from these points to a reference patch. Internal control points are established so as to minimize the total sum of these distances. This permits generation of the patch having a desired surface shape.

According to the invention, internal control points may be established in the frame space of a patch so as to generate a patch whose external shape is represented by a plurality of points. In that case, entering a group of points makes for easy generation of the patch having the external shape represented by the input group of points.

Alternatively, a plurality of points may be established on the patch to be modified, and the shortest distances from these points on that patch to a target patch for modification are obtained. With these distances used as reference, internal control points are established within the frame space of the patch to be modified. This makes it possible to generate the patch having the initial surface shape even when the frame space is modified.

As many apparently different embodiments of this invention may be made without departing from the spirit and scope thereof, it is to be understood that the invention is not limited to the specific embodiments thereof except as defined in the appended claims.

What is claimed is:

1. A method for producing a sculpted surface by electronically generating data representing a free curve in a vector coordinate system, using a predetermined parameter based upon two nodes having control points interposed therebetween in a cubic space, the method comprising the steps of:

inputting data representative of a point sequence, the point sequence defininga free curve;

establishing one of the two nodes as a starting point and the other of the two nodes as an end point of the point sequence;

temporarily establishing the control point based upon points in the points sequence, the points in the point sequence being adjacent to the starting point and the end point;

generating data representative of perpendiculars from the points in the point sequence to a free curve vector determined by the nodes and by the control points;

generating data representative of an intersection point of each perpendicular and the free curve;

re-establishing the control points by determining the solution to simultaneous linear equations having two unknowns and a square-sum as variables, the square-sum equal to the total of the square of each distance between the points in the point sequence and the intersection point of each perpendicular and the free curve;

generating data representative of the free curve, the point sequence based upon the two nodes and the re-established control points;

transferring the data representative of the free curve to milling means; and driving the milling means according to the transferred data to cut at least a portion of a workpiece to correspond to at least a portion of the free curve.

2. A method for generating a sculptured surface by locating in a frame space a patch expressed by a predetermined vector function based upon internal control points established in said frame space enclosed by boundary curves in a cubic space, said method comprising the steps of:

inputting data representative of coordinate data of a plurality of points defining the sculpted surface;

detecting a shortest distance based upon the coordinate data, between each of the plurality of points and the patch;

generating a new patch by re-establishing the internal control points, the internal control points re-established by determining the solution to simultaneous linear equations having two unknowns and a square-sum as variables, the square sum equal to the total sum of the square of each distance between each of the plurality of points and sculpted surface;

transferring data representative of the new patch to milling means; and driving the milling means according to the transferred data to shape at least a portion of a workpiece to correspond to the sculpted surface.

3. A method for generating a sculptured surface by locating in a frame space a patch expressed by a predetermined vector function based upon internal control points established in said frame space enclosed by boundary curves in a cubic space, said method comprising the steps of:

inputting data representative of coordinate data of a plurality of points defining the sculpted surface;

detecting a shortest distance, based upon the coordinate data between each of the plurality of points and the patch;

establishing the internal control points in the frame space containing the patch to minimize the total sum of the shortest distances;

generating a new patch by having an external shape defined by the plurality of points;

transferring data representative of the new patch to milling means; and driving the milling means according to the transferred data to shape at least a portion of a workpiece to correspond to the sculpted surface.

4. A method for generating a sculptured surface by locating in a frame space a patch expressed by a predetermined vector function based upon internal control points established in said frame space enclosed by boundary curves in a cubic space, said method comprising the steps of:

inputting data representative of coordinate data of a plurality of points defining a patch;

establishing a plurality of points on the patch to be modified;

detecting a shortest distance between each of said plurality of points on the one hand, and a reference patch for modification on the other;

establishing said internal control points within said frame space of said patch to be modified, the establishing of said internal control points being performed in such a manner as to minimize a total sum of said shortest distances;

generating data representative of a patch approximating a surface shape of said reference patch for modification, said patch being generated within said frame space of said patch to be modified;

transferring the data representative of the patch to milling means; and driving the milling means according to the transferred data to shape at least a portion of a workpiece into the sculpted surface.

5. A method for generating a sculptured surface according to claim 2, 3 or 4, wherein said sculptured surface as it is being generated is made visible on a display unit.

* * * * *

UNITED STATES PATENT AND TRADEMARK OFFICE
CERTIFICATE OF CORRECTION

PATENT NO. : 5,410,645
DATED : April 25, 1995
INVENTOR(S) : Miwa Oaka, et. al.

It is certified that error appears in the above-indentified patent and that said Letters Patent is hereby corrected as shown below:

Column 24, line 40, replace "defininga" with --defining a --.

Signed and Sealed this

Twenty-second Day of August, 1995

*Attest:*

BRUCE LEHMAN

*Attesting Officer*  *Commissioner of Patents and Trademarks*